(12) United States Patent
Kondo et al.

(10) Patent No.: US 7,218,791 B2
(45) Date of Patent: May 15, 2007

(54) IMAGE PROCESSING DEVICE AND METHOD, AND IMAGING DEVICE

(75) Inventors: Tetsujiro Kondo, Tokyo (JP); Takahiro Nagano, Kanagawa (JP); Junichi Ishbashi, Saitama (JP); Takashi Sawao, Tokyo (JP); Naoki Fujiwara, Tokyo (JP); Seiji Wada, Kanagawa (JP); Toru Miyake, Tokyo (JP)

(73) Assignee: Sony Corporation, Tokyo (JP)

( * ) Notice: Subject to any disclaimer, the term of this patent is extended or adjusted under 35 U.S.C. 154(b) by 826 days.

(21) Appl. No.: 10/276,229

(22) PCT Filed: Mar. 12, 2002

(86) PCT No.: PCT/JP02/02275

§ 371 (c)(1),
(2), (4) Date: Apr. 28, 2003

(87) PCT Pub. No.: WO02/076091

PCT Pub. Date: Sep. 26, 2002

(65) Prior Publication Data

US 2003/0164882 A1 Sep. 4, 2003

(30) Foreign Application Priority Data

Mar. 15, 2001 (JP) ............................. 2001-73851

(51) Int. Cl.
*G06K 9/40* (2006.01)
(52) U.S. Cl. ..................... 382/254; 348/430.1; 358/447
(58) Field of Classification Search ................ 382/100, 382/254; 348/14.15, 317, 513, 456, 430.1, 348/606–624; 358/463, 447
See application file for complete search history.

(56) References Cited

U.S. PATENT DOCUMENTS 3,875,584 A * 4/1975 Fletcher et al. ............. 348/621

(Continued)

FOREIGN PATENT DOCUMENTS

EP 0 395268 10/1990

(Continued)

OTHER PUBLICATIONS

Derwent abstract accession No. 97-219767/20, JP 09065193A, (Victor CO of Japan), Mar. 7, 1997.

(Continued)

*Primary Examiner*—Vikkram Bali
*Assistant Examiner*—Anand Bhatnagar
(74) *Attorney, Agent, or Firm*—Frommer Lawrence & Haug LLP; William S. Frommer; Thomas F. Presson

(57) ABSTRACT

The present invention relates to an image processing apparatus for generating an image having a high density in the direction of time and having a natural-looking motion blur. The correlation calculators 103 and 104 respectively calculate a correlation between pixel data of a target pixel in a target frame #n from among frames and pixel data of a corresponding pixel in a first frame #n−1 next to the target frame #n and a correlation between the pixel data of the target pixel in the target frame #n and pixel data of a corresponding pixel in a second frame #n+1 next to the target frame #n. The half-side pixel value generator 105 generates first pixel data in a first synthesis frame generated between the target frame #n and one of the first frame #n−1 and the second frame #n+1 containing the corresponding pixel having the pixel data with a larger correlation. The half-side pixel value generator 106 generates second pixel data in a second synthesis frame generated between the target frame #n and the other of the first frame and the second frame, based on the target pixel data and the first pixel data.

35 Claims, 37 Drawing Sheets

U.S. PATENT DOCUMENTS

| | | | |
|---|---|---|---|
| 4,107,736 A | * | 8/1978 | Lowry et al. ............... 348/621 |
| 4,672,442 A | * | 6/1987 | Yamaguchi et al. ........ 348/459 |
| 5,442,462 A | * | 8/1995 | Guissin ...................... 358/463 |
| 6,442,203 B1 | * | 8/2002 | Demos .................. 375/240.16 |
| 2005/0243178 A1 | * | 11/2005 | McConica ............ 348/208.99 |
| 2006/0008170 A1 | * | 1/2006 | Beausoleil et al. ......... 382/254 |

FOREIGN PATENT DOCUMENTS

| | | |
|---|---|---|
| GB | 2110046 | 6/1983 |
| JP | 58-190184 | 11/1983 |
| JP | 61-26382 | 2/1986 |
| JP | 3-101389 | 4/1991 |
| JP | 5-167991 | 7/1993 |
| JP | 6-78279 | 3/1994 |
| WO | WO 84 02990 | 8/1984 |

OTHER PUBLICATIONS

Derwent abstract accession No. 97-379473/35, JP 09163217A, (Samsung Electronics CO Ltd), Jun. 20, 1997.

* cited by examiner

FIG. 3
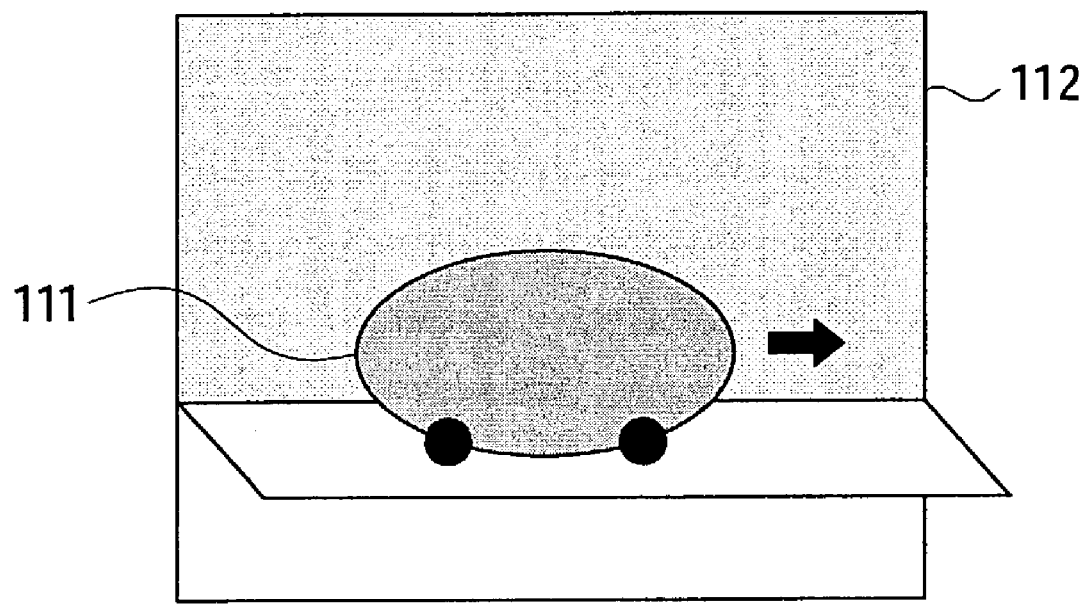
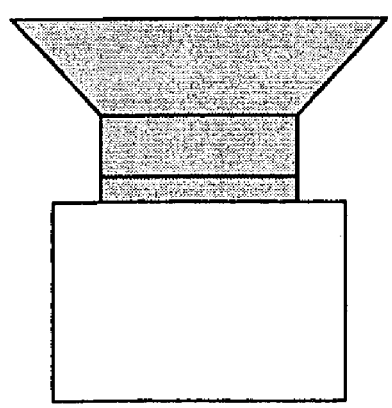

| AREA | | DESCRIPTION |
|---|---|---|
| BACKGROUND AREA | | STILL PORTION |
| FOREGROUND AREA | | MOVING PORTION |
| MIXED AREA | COVERED BACKGROUND AREA | AREA TRANSITIONED FROM BACKGROUND TO FOREGROUND |
| | UNCOVERED BACKGROUND AREA | AREA TRANSITIONED FROM FOREGROUND TO BACKGROUND |

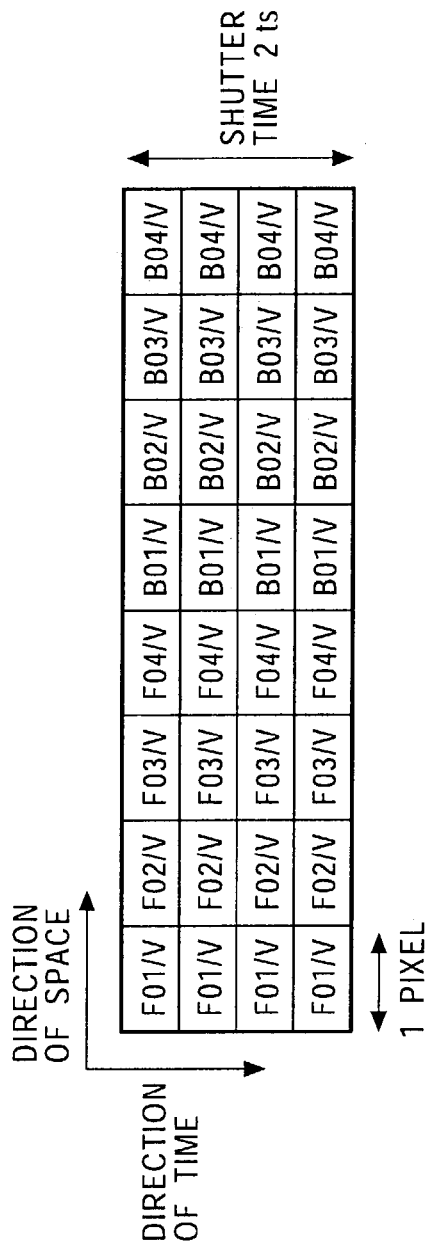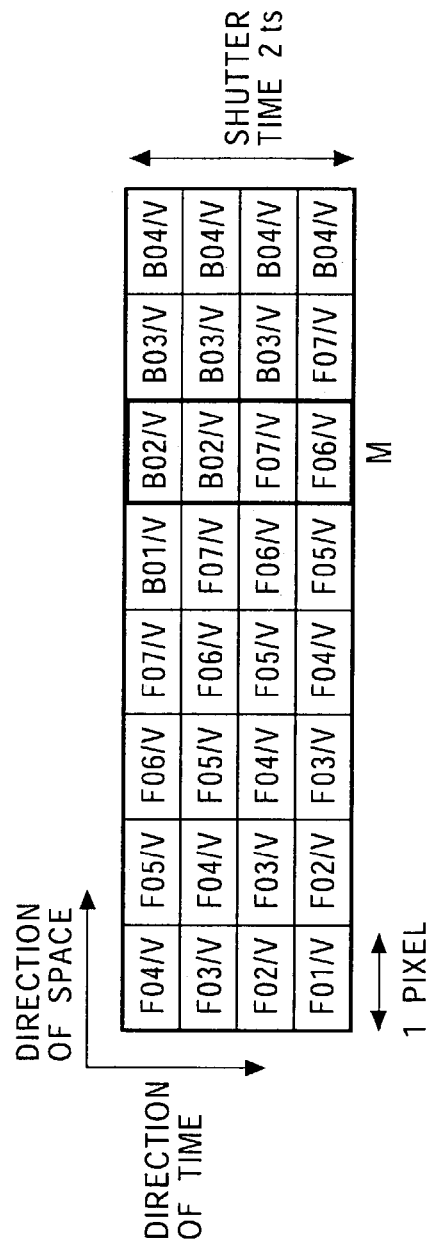

IMAGE PROCESSING DEVICE AND METHOD, AND IMAGING DEVICE

TECHNICAL FIELD

The present invention relates to an image processing apparatus and, in particular, to an image processing apparatus that accounts for a difference between a signal detected by a sensor and the real world.

BACKGROUND ART

Techniques for detecting an event in the real world and for processing sampled data output from an image sensor are in widespread use.

For example, the image of an object moving in front of a stationary predetermined background, taken by a video camera, suffers from a motion blur when the motion speed of the object is relatively fast.

Also, a technique that generates a high-density image in the direction of time based on an image taken by a video camera is used.

However, a motion blue is not taken into consideration when a high-density image is generated in the direction of time. A high-density image generated in the direction of time based on an image having a motion blue becomes an unnatural image.

DISCLOSURE OF THE INVENTION

The present invention has been developed in view of this problem, and it is an object of the present invention to generate a high-density image in the direction of time having a natural motion blur.

An image processing apparatus of the present invention for processing an image formed of pixel data of frames, obtained by a sensor including detector elements, each having a time integration effect, includes correlation detector means for detecting a correlation between pixel data of a target pixel in a target frame from among frames and pixel data of a corresponding pixel in a first frame adjacent to the target frame, and a correlation between the pixel data of the target pixel in the target frame and pixel data of a corresponding pixel in a second frame adjacent to the target frame, and pixel data generator means for generating pixel data of a first pixel in a first synthesis frame generated between the target frame and one of the first and second frames containing the corresponding pixel having the pixel data with a larger correlation, based on the pixel data of one of the corresponding pixels in the first and second frames having the larger correlation detected by the correlation detector means, and for generating pixel data of a second pixel in a second synthesis frame generated between the target frame and the other of the first and second frames, based on the pixel data of the target pixel and the pixel data of the first pixel.

The pixel data generator means may copy the pixel data of the one of the corresponding pixels in the first and second frames having the larger correlation detected by the correlation detector means as the pixel data of the first pixel in the first synthesis frame generated between the target frame and the one of the first and second frames containing the corresponding pixel having the pixel data with the larger correlation.

The pixel data generator means may generate the first synthesis frame at a position equally spaced in time from the first frame and the target frame, and the second synthesis frame at a position equally spaced in time from the second frame and the target frame.

The pixel data generator means may calculate the pixel data of the second pixel by subtracting the value of the pixel data of the first pixel from a value equal to twice the value of the pixel data of the target pixel.

The image processing apparatus may process the image which is obtained by the sensor having a plurality of detector elements arranged in at least one direction.

The image processing apparatus may process the image which is obtained by the sensor having a plurality of detector elements arranged in a matrix form.

The correlation detector means may detect a difference of the pixel data as the correlation.

An image processing method of the present invention includes a correlation detection step for detecting a correlation between pixel data of a target pixel in a target frame from among frames and pixel data of a corresponding pixel in a first frame adjacent to the target frame, and a correlation between the pixel data of the target pixel in the target frame and pixel data of a corresponding pixel in a second frame adjacent to the target frame, and a pixel data generation step for generating pixel data of a first pixel in a first synthesis frame generated between the target frame and one of the first and second frames containing the corresponding pixel having the pixel data with a larger correlation, based on the pixel data of one of the corresponding pixels in the first and second frames having the larger correlation detected in the correlation detection step, and for generating pixel data of a second pixel in a second synthesis frame generated between the target frame and the other of the first and second frames, based on the pixel data of the target pixel and the pixel data of the first pixel.

The pixel data generation step may copy the pixel data of the one of the corresponding pixels in the first and second frames having the larger correlation detected in the correlation detection step as the pixel data of the first pixel in the first synthesis frame generated between the target frame and the one of the first and second frames containing the corresponding pixel having the pixel data with the larger correlation.

The pixel data generation step may generate the first synthesis frame at a position equally spaced in time from the first frame and the target frame, and the second synthesis frame at a position equally spaced in time from the second frame and the target frame.

The pixel data generation step may calculate the pixel data of the second pixel by subtracting the value of the pixel data of the first pixel from a value equal to twice the value of the pixel data of the target pixel.

In the image processing method, the image may be processed which is obtained by the sensor having a plurality of detector elements arranged in at least one direction.

In the image processing method, the image may be processed which is obtained by the sensor having a plurality of detector elements arranged in a matrix form.

The correlation detection step may detect a difference of the pixel data as the correlation.

A program stored in a storage medium of the present invention includes a correlation detection step for detecting a correlation between pixel data of a target pixel in a target frame from among frames and pixel data of a corresponding pixel in a first frame adjacent to the target frame, and a correlation between the pixel data of the target pixel in the target frame and pixel data of a corresponding pixel in a second frame adjacent to the target frame, and a pixel data generation step for generating pixel data of a first pixel in a first synthesis frame generated between the target frame and one of the first and second frames containing the corresponding pixel having the pixel data with a larger correlation, based on the pixel data of one of the corresponding pixels in the first and second frames having the larger correlation detected in the correlation detection step, and for generating pixel data of a second pixel in a second synthesis frame generated between the target frame and the other of the first and second frames, based on the pixel data of the target pixel and the pixel data of the first pixel.

The pixel data generation step may copy the pixel data of the one of the corresponding pixels in the first and second frames having the larger correlation detected in the correlation detection step as the pixel data of the first pixel in the first synthesis frame generated between the target frame and the one of the first and second frames containing the corresponding pixel having the pixel data with the larger correlation.

The pixel data generation step may generate the first synthesis frame at a position equally spaced in time from the first frame and the target frame, and the second synthesis frame at a position equally spaced in time from the second frame and the target frame.

The pixel data generation step may calculate the pixel data of the second pixel by subtracting the value of the pixel data of the first pixel from a value equal to twice the value of the pixel data of the target pixel.

The image may be processed which is obtained by the sensor having a plurality of detector elements arranged in at least one direction.

The image may be processed which is obtained by the sensor having a plurality of detector elements arranged in a matrix form.

The correlation detection step may detect a difference of the pixel data as the correlation.

A program of the present invention causes a computer to perform a process, wherein the process includes a correlation detection step for detecting a correlation between pixel data of a target pixel in a target frame from among frames and pixel data of a corresponding pixel in a first frame adjacent to the target frame, and a correlation between the pixel data of the target pixel in the target frame and pixel data of a corresponding pixel in a second frame adjacent to the target frame, and a pixel data generation step for generating pixel data of a first pixel in a first synthesis frame generated between the target frame and one of the first and second frames containing the corresponding pixel having the pixel data with a larger correlation, based on the pixel data of one of the corresponding pixels in the first and second frames having the larger correlation detected in the correlation detection step, and for generating pixel data of a second pixel in a second synthesis frame generated between the target frame and the other of the first and second frames, based on the pixel data of the target pixel and the pixel data of the first pixel.

The pixel data generation step may copy the pixel data of the one of the corresponding pixels in the first and second frames having the larger correlation detected in the correlation detection step as the pixel data of the first pixel in the first synthesis frame generated between the target frame and the one of the first and second frames containing the corresponding pixel having the pixel data with the larger correlation.

The pixel data generation step may generate the first synthesis frame at a position equally spaced in time from the first frame and the target frame, and the second synthesis frame at a position equally spaced in time from the second frame and the target frame.

The pixel data generation step may calculate the pixel data of the second pixel by subtracting the value of the pixel data of the first pixel from a value equal to twice the value of the pixel data of the target pixel.

A computer executing the program may process the image which is obtained by the sensor having a plurality of detector elements arranged in at least one direction.

A computer executing the program may process the image which is obtained by the sensor having a plurality of detector elements arranged in a matrix form.

The correlation detection step may detect a difference of the pixel data as the correlation.

An image pickup device of the present invention includes image pickup means for outputting, as pixel data of frames, an object image picked up by an image pickup unit having a predetermined number of pixels, each having a time integration effect, correlation detector means for detecting a correlation between pixel data of a target pixel in a target frame from among frames and pixel data of a corresponding pixel in a first frame adjacent to the target frame, and a correlation between the pixel data of the target pixel in the target frame and pixel data of a corresponding pixel in a second frame adjacent to the target frame, and pixel data generator means for generating pixel data of a first pixel in a first synthesis frame generated between the target frame and one of the first and second frames containing the corresponding pixel having the pixel data with a larger correlation, based on the pixel data of one of the corresponding pixels in the first and second frames having the larger correlation detected by the correlation detector means, and for generating pixel data of a second pixel in a second synthesis frame generated between the target frame and the other of the first and second frames, based on the pixel data of the target pixel and the pixel data of the first pixel.

The pixel data generator means may copy the pixel data of the one of the corresponding pixels in the first and second frames having the larger correlation detected by the correlation detector means as the pixel data of the first pixel in the first synthesis frame generated between the target frame and the one of the first and second frames containing the corresponding pixel having the pixel data with the larger correlation.

The pixel data generator means may generate the first synthesis frame at a position equally spaced in time from the first frame and the target frame, and the second synthesis frame at a position equally spaced in time from the second frame and the target frame.

The pixel data generator means may calculate the pixel data of the second pixel by subtracting the value of the pixel data of the first pixel from a value equal to twice the value of the pixel data of the target pixel.

The image processing device may process the image which is obtained by the sensor having a plurality of detector elements arranged in at least one direction.

The image processing device may process the image which is obtained by the sensor having a plurality of detector elements arranged in a matrix form.

The correlation detector means may detect a difference of the pixel data as the correlation.

A natural-looking image high in density in the direction of time is thus obtained.

BRIEF DESCRIPTION OF THE DRAWINGS

FIG. 3 is a diagram illustrating an image pickup operation of a sensor.

FIG. 10 is a model diagram illustrating the pixel values developed in time axis for a duration of time corresponding to shutter time 2 ts, which is divided.

FIG. 11 is a model diagram illustrating the pixel values developed in the time axis for the duration of time corresponding to the shutter time 2 ts, which divided.

BEST MODE FOR CARRYING OUT THE INVENTION

Figure 1:
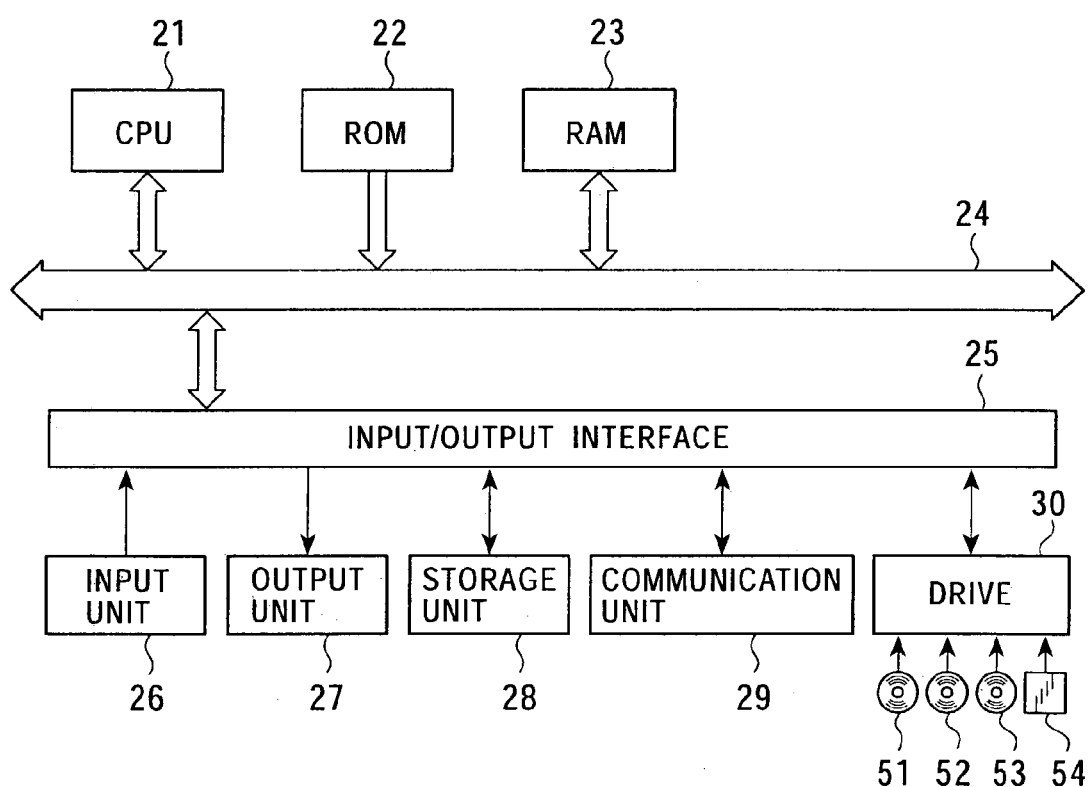
FIG. 1 is a block diagram illustrating one embodiment of the image processing apparatus of the present invention.

FIG. 1 is block diagram illustrating one embodiment of the image processing apparatus of the present invention. A CPU (Central Processing Unit) 21 executes a variety of processes in accordance with software programs stored in a ROM (Read Only Memory) 22 or a storage unit 28. A RAM (Random Access Memory) 23 stores software programs executed by the CPU 21 and data as necessary. The CPU 21, the ROM 22, and the RAM 23 are interconnected to each other through a bus 24.

The CPU 21 is connected to an input and output interface 25 through the bus 24. Also connected to the input and output interface 25 are an input unit 26 such as a keyboard, a mouse, or a microphone, and an output unit 27 such as a display or a loudspeaker. The CPU 21 executes a variety of processes in response to a command input from the input unit 26. The CPU 21 outputs an image, voice, etc. obtained as a result of the processes to the output unit 27.

The storage unit 28, connected to the input and output interface 25, is a hard disk, and stores the program executed by the CPU 21 and a diversity of pieces of data. A communication unit 29 communicates with an external apparatus through the Internet or other networks. In this case, the communication unit 29 works as a capturing unit for capturing the output from the sensor.

A software program may be obtained through the communication unit 29 and may be stored in the storage unit 28.

When a drive 30, connected to the input and output interface 25, is loaded with a magnetic disk 51, an optical disk 52, a magnetooptical disk 53, or a semiconductor memory 54, the drive 30 drives the recording medium thereby acquiring a software program and data. The acquired software program and data are transferred to and stored in the storage unit 28 as necessary.

The process of the image processing apparatus for generating an image having a high density in the direction of time from the data captured from the sensor is discussed below.

Figure 2:
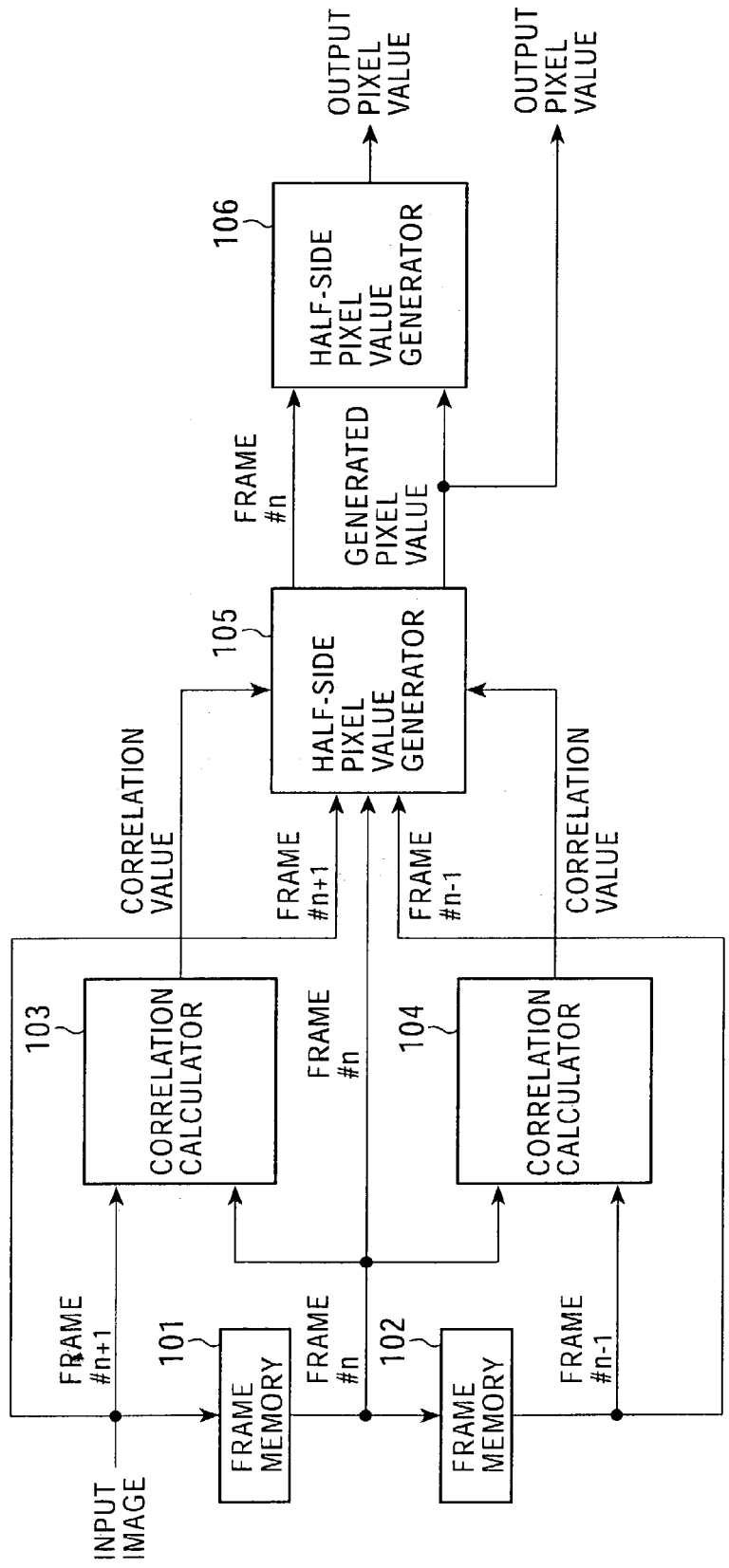
FIG. 2 is a block diagram illustrating the construction of the image processing apparatus.

FIG. 2 is a block diagram illustrating the construction of the image processing apparatus.

Whether the functions of the image processing apparatus are embodied in hardware or software is not important. In other words, each block diagram in this description may be considered as a hardware block diagram or a software functional block diagram.

The motion blur here refers to a distortion, contained in an image corresponding to a moving object, and caused by the movement of the object in the real world to be imaged and the imaging characteristics of the sensor.

In the description of the invention, an image corresponding to an object in the real world to be imaged is referred to as an image object.

The input image fed to the image processing apparatus is input to a frame memory 101, a correlation calculator 103, and a half-side pixel value generator 105.

The frame memory 101 stores the input image frame by frame, and feeds the stored image to a frame memory 102, the correlation calculator 103, the correlation calculator 104, and the half-side pixel value generator 105. When a frame #n+1 of the input image is fed to the image processing apparatus, the frame memory 101 feeds the image of frame #n to the frame memory 102, the correlation calculator 103, the correlation calculator 104, and the half-side pixel value generator 105.

The frame #n+1 is a frame in succession to the frame #n, and the frame #n is a frame in succession to a frame #n−1.

The frame memory 102 stores the image supplied from the frame memory 101, and feeds the stored image to the correlation calculator 104, and the half-side pixel value generator 105. When the image processing apparatus is supplied with the input image of #n+1, the frame memory 102 feeds the image of frame #n−1 to the correlation calculator 104 and the half-side pixel value generator 105.

The correlation calculator 103 calculates a correlation value between a target pixel in the frame #n supplied from the frame memory 101 and the corresponding pixel in the frame #n+1, and feeds the correlation value to the half-side pixel value generator 105. For example, the correlation value calculated by the correlation calculator 103 is based on a difference between the pixel value of the target pixel in the frame #n and the pixel value of the corresponding pixel in the frame #n+1. When the pixel values of these pixels are close to each, the correlation of the pixels is considered to be high. In other words, the smaller the difference of the pixel values, the higher the correlation.

The correlation calculator 104 calculates a correlation value between a target pixel in the frame #n supplied from the frame memory 101 and the corresponding pixel in the frame #n−1 supplied from the frame memory 102, and feeds the resulting correlation value to the half-side pixel value generator 105. For example, the correlation value calculated by the correlation calculator 104 is based on a difference between the pixel value of the target pixel in the frame #n and the pixel value of the corresponding pixel in the frame #n−1.

The half-side pixel value generator 105 generates a pixel value of an image having a double density in the direction of time corresponding to the frame #n, based on the correlation value supplied from the correlation calculator 103 and the correlation value supplied from the correlation calculator 104, and the pixel values of the frame #n−1 through the frame #n+1. The generated pixel values are fed to a half-side pixel value generator 106. The generated pixel values are also output as an image having a double density in the direction of time.

The image having a double density in the direction of time is also referred to a double-density image.

The half-side pixel value generator 105 also supplies the half-side pixel value generator 106 with the image of frame #n.

The half-side pixel value generator 106 generates another pixel value of an image having a double density in the direction of time corresponding to the frame #n, based on the pixel value of the image having a double density in the direction of time supplied from the half-side pixel value generator 105, and the image of frame #n, and outputs the generated pixel value as an image having a double density in the direction of time.

Referring to FIG. 3 through FIG. 19, the input image fed to the image processing apparatus is discussed below.

FIG. 3 illustrates the imaging operation by a sensor. The sensor is formed of a CCD video camera having a CCD (Charge-Coupled Device) area sensor as a solid-state image pickup device. An object 111, corresponding to the foreground in the real world, horizontally moves from the left-hand side to the right-hand side between an object 112 corresponding to the background in the real world and the sensor.

The sensor captures the images of the object 111 corresponding to the foreground together with the object 112 corresponding to the background. The sensor then outputs the captured image in units of one frame. For example, the sensor outputs an image formed 30 frames per second. The exposure time of the sensor is thus 1/30 second. The exposure time is a duration of time from the beginning of the conversion of input light into electric charge and the end of the conversion of the input light into electric charge. The exposure time is also referred to as shutter time.

Figure 4:
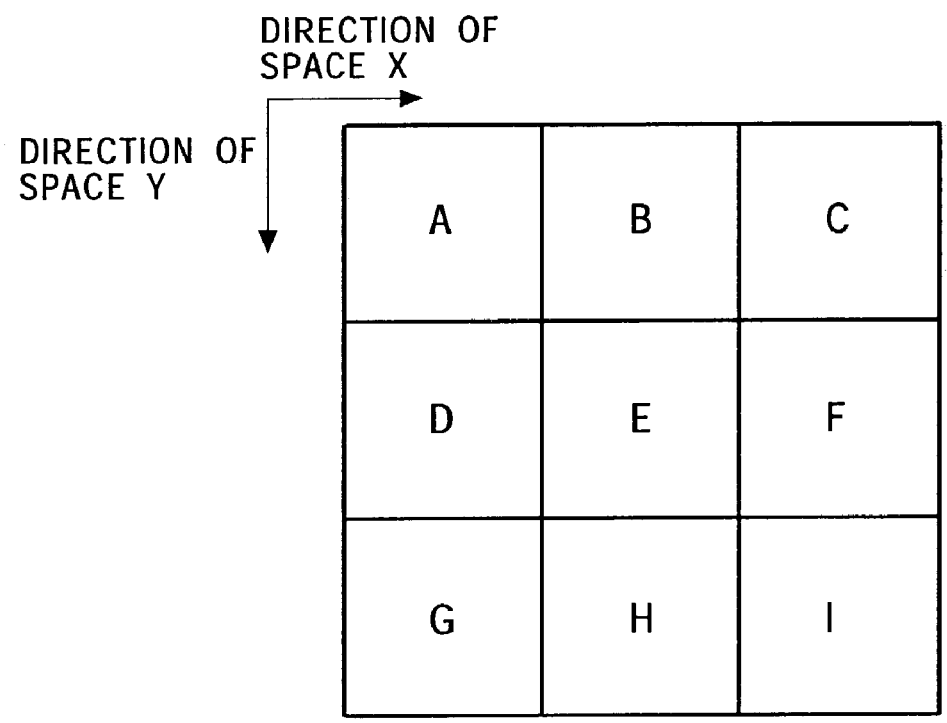
FIG. 4 illustrates the layout of pixels.

FIG. 4 is a diagram illustrating the arrangement of pixels. As shown, the letters A through I respectively represent individual pixels. The pixels are arranged on a plane corresponding to the image. A single detector element corresponding to a single pixel is arranged on the sensor. When the sensor captures the images, a single detector element outputs a pixel value corresponding to a single pixel forming the image. For example, the location of each detector element in the X direction corresponds to a location in the horizontal direction of the image and the location of each detector element in the Y direction corresponds to a location in the vertical direction of the image.

Figure 5:
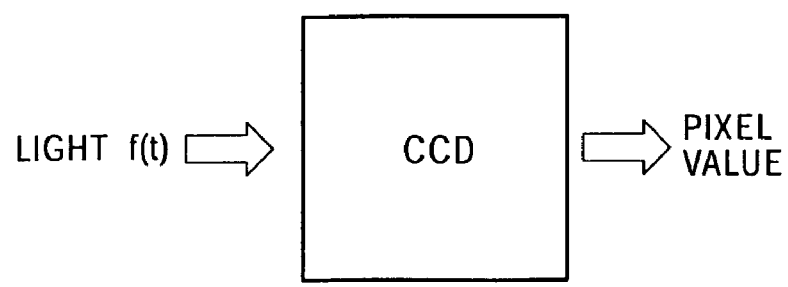
FIG. 5 illustrates the operation of a detector element.

Referring to FIG. 5, the detector element as the CCD converts the input light into electric charge for a duration of time corresponding to the shutter time, and accumulates the resulting electric charge. The amount of electric charge is substantially proportional to the intensity of input light and the period of time during which light is input. During the period of time corresponding to the shutter time, the detector element adds, to the already accumulated charge, charge into which the input light is converted. Specifically, the detector element integrates the input light for a duration of time corresponding to the shutter time, and stores the electric charge responsive to the integrated light. The detector element is thus called as having a time integration effect.

The electric charge stored in the detector element is converted into a voltage value by an unshown circuit, and the voltage value is converted into a pixel value such as digital data, and then output. The individual pixel values output from the sensor have a value projected in one-dimensional space, which is obtained by integrating, with respect to the shutter time, a given portion of an object corresponding to the foreground or the background, and having a spatial expanse.

Figure 6:
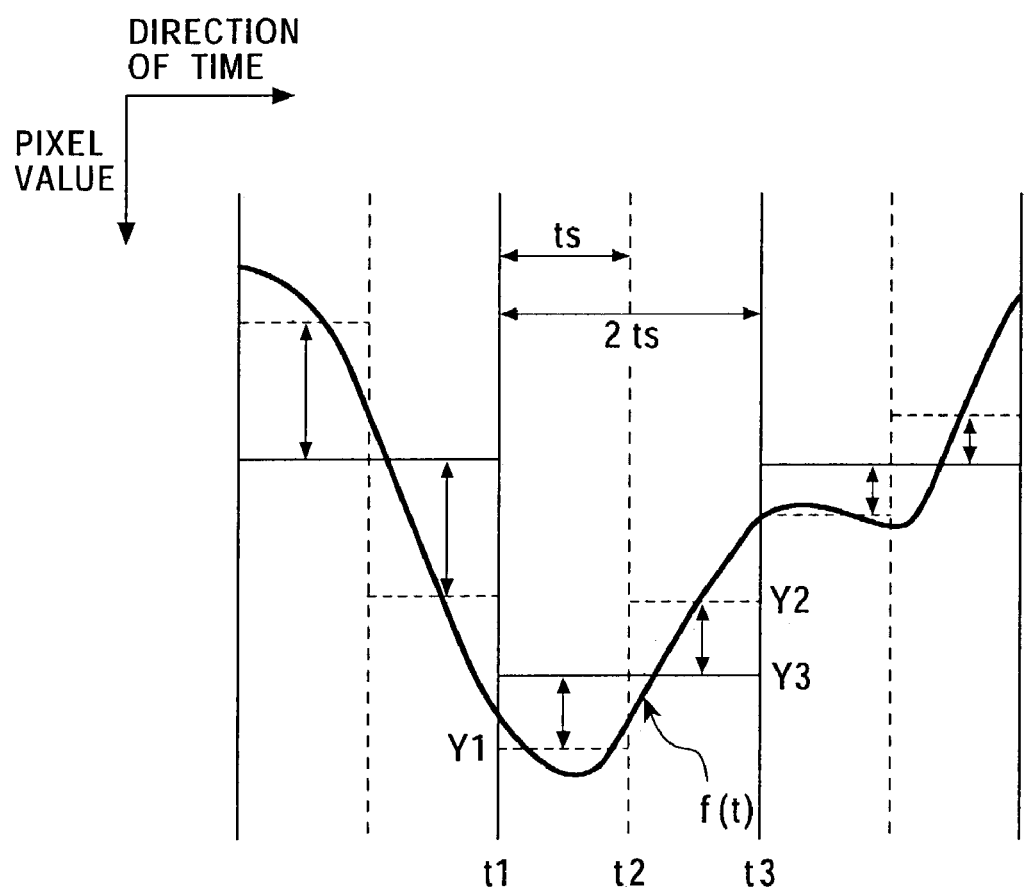
FIG. 6 plots pixel data of the sensor having an integration effect in response to the input of light.

FIG. 6 plots pixel data of the sensor having an integration effect in response to the input of light responsive to the input. Referring to FIG. 6, f(t) represents a chronologically ideal pixel value responsive to the input light and infinitesimal time.

Referring to FIG. 6, the horizontal solid lines represent pixel values of the input image captured by the sensor. Referring to FIG. 6, the horizontal broken lines represent the pixel values of an image having a double density in the direction of time.

As shown, the shutter time of the sensor is a duration from time t1 to time t3, and is represented by 2 ts.

On the assumption that the pixel value of a single piece of pixel data is represented by the uniform integration of an ideal pixel value f(t), the pixel value Y1 of the pixel data corresponding to the duration from time t1 to time t3 is expressed in equation (1), and the pixel value Y2 of the pixel data corresponding to the duration from time t2 to time t3 is expressed in equation (2), and the pixel value Y3 output from the sensor is expressed in equation (3).

$$Y1 = \int_{t1}^{t2} f(t)dt \cdot \frac{1}{ts} \qquad (1)$$

$$Y2 = \int_{t2}^{t3} f(t)dt \cdot \frac{1}{ts} \qquad (2)$$

$$Y3 = \int_{t1}^{t3} f(t)dt \cdot \frac{1}{2ts} \qquad (3)$$

$$= \frac{Y1 + Y2}{2}$$

Equations (4) and (5) are obtained by rewriting equation (3).

$$Y1 = 2 \cdot Y3 - Y2 \qquad (4)$$

$$Y2 = 2 \cdot Y3 - Y1 \qquad (5)$$

If the pixel value Y3 from the sensor and the pixel value Y2 of the pixel data corresponding to the duration from time t2 to time t3 are known, the pixel value Y1 of the pixel data corresponding to the duration from time t1 to time t2 is calculated from equation (4). If the pixel value Y3 from the sensor and the pixel value Y1 of the pixel data corresponding to the duration from time t1 to time t2 are known, the pixel value Y2 of the pixel data corresponding to the duration from time t2 to time t3 is calculated from equation (5).

If the pixel value of one pixel and one of the pixel values of the pixel data corresponding to the two durations with respect to the one pixel are known in this way, the pixel value of the other of pixel data corresponding to the two durations is calculated.

Figure 7A:
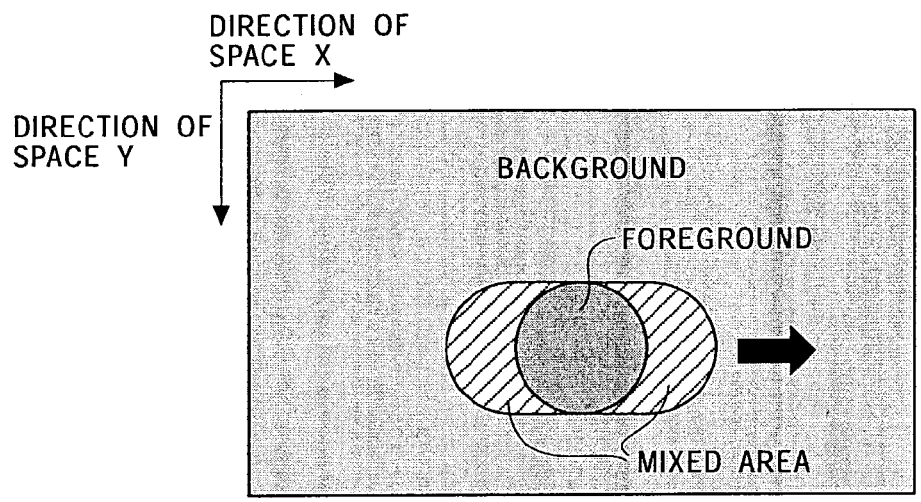
FIG. 7A illustrates an image that is obtained by photographing an object corresponding to a moving foreground and an object corresponding to a stationary background.

FIG. 7A illustrates an image that is obtained by imaging an object corresponding to a moving foreground and an object corresponding to a stationary background. As shown, the object corresponding to the foreground horizontally moves from the left-hand side to the right-hand side with respect to the screen.

Figure 7B:
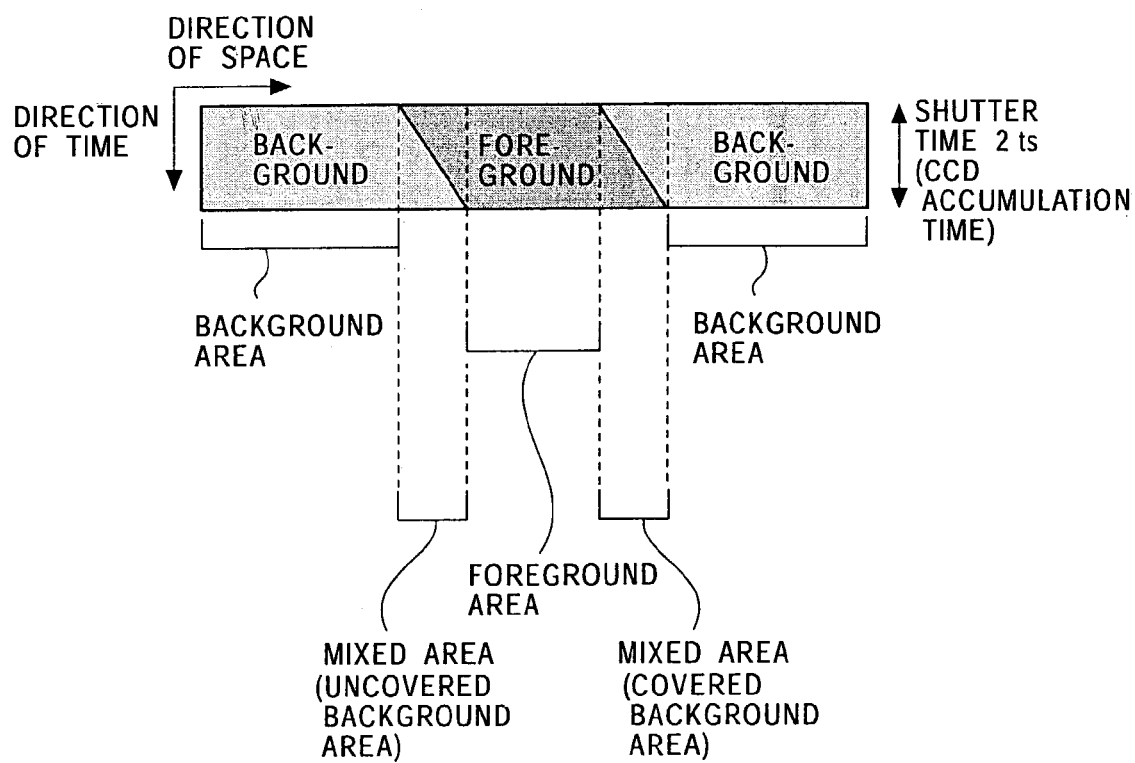
FIG. 7B illustrates a model of an image that is obtained by photographing an object corresponding to a moving foreground and an object corresponding to a stationary background.

FIG. 7B illustrates a model diagram in which the pixel values in a single line of the image illustrated in FIG. 7A are developed in time axis. The horizontal direction of FIG. 7B corresponds to the direction of space X in FIG. 7A.

The pixels in the background area have pixel values formed of only the component of the image corresponding to the background object (hereinafter referred to as the background component). The pixels in the foreground area have pixel values formed of only the component of the image corresponding to the foreground object (hereinafter referred to as the foreground component).

The pixels in the mixed area have pixel values of the background component and the foreground component. Since the pixels in the mixed area are formed of the background component and the foreground component, it may be called a distorted area. The mixed area is divided into a covered background area and an uncovered background area.

The covered background area is a portion of the mixed area corresponding to a forward end of the object of the foreground in the direction of movement thereof, and in the covered background area, the background is covered with the foreground with the elapse of time.

In contrast, the uncovered background area is a portion of the mixed area corresponding to a backward end of the object of the foreground in the direction of movement, and in the uncovered background, the background is appearing with the elapse of time.

In this way, an image, containing the foreground, the background, the covered background area, and the uncovered background area is fed, as the input image, to each of the frame memory 101, the correlation calculator 103, and the half-side pixel value generator 105.

Figures 8, 9:
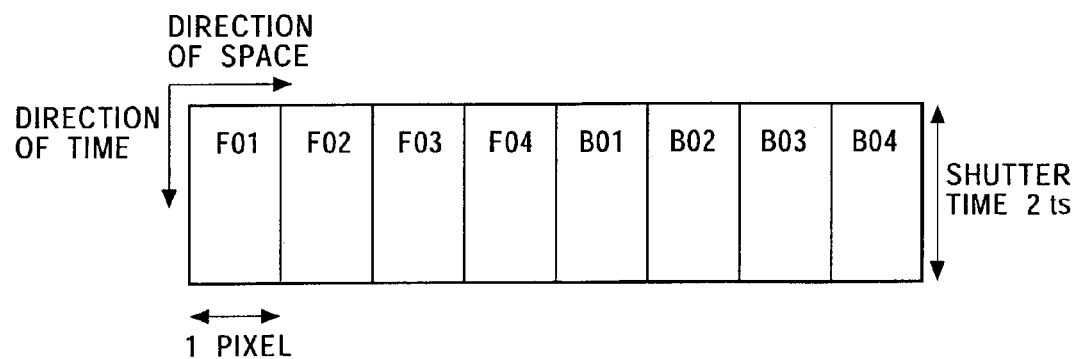
FIG. 8 illustrates a background area, a foreground area, a mixed area, a covered background area, and an uncovered background area.
FIG. 9 is a model diagram illustrating pixel values of a line of adjacent pixels developed in time axis in an image of the object corresponding to the stationary foreground and the object corresponding to the stationary background.

FIG. 8 explains the background area, the foreground area, the mixed area, the covered background area, and the uncovered background area. In view of the image illustrated in FIG. 7, the background area is a still portion, the foreground area is a moving portion, the covered background of the mixed area is a portion where the background transitions into the foreground, and the uncovered background of the mixed area is a portion where the foreground transitions into the background.

FIG. 9 is a model diagram illustrating pixel values of a line of consecutively arranged pixels developed in time axis in an image of the object corresponding to the moving foreground and the object corresponding to the stationary background. For example, the pixels arranged in a line of the image are selected as a line of adjacent pixels Pixel values F01 through F04 illustrated in FIG. 9 are those of the pixels corresponding to the object of a still foreground, and pixel values B01 through B04 illustrated in FIG. 9 are those of the pixels corresponding to the object of a sill background.

The vertical direction from top to bottom in FIG. 9 represents the elapse of time. The top side of the rectangle shown in FIG. 9 corresponds to time at which the conversion of light incident on the sensor into electric charge starts, and the bottom side of the rectangle shown in FIG. 9 corresponds to time at which the conversion of light incident on the sensor into electric charge ends. Specifically, the distance from the top side to the bottom side of the rectangle refers to the shutter time 2 ts.

In the discussion that follows, the shutter time 2 ts and the frame interval are equal to each other.

The horizontal direction in FIG. 9 corresponds to the direction of space X discussed with reference to FIG. 7. Specifically, in the example shown in FIG. 9, the distance from the left side of the rectangle designated "F01" to the right side of the rectangle designated "B04" as shown in FIG. 9 corresponds to eight times the pixel pitch, namely, corresponds to the extension of 8 consecutive pixels.

When the object of the foreground and the object of the background are still, light incident on the sensor remains unchanged for a duration of time corresponding to the shutter time 2 ts.

The duration of time corresponding to the shutter time 2 ts is divided into at least two equal length segments. For example, when a virtual divisor number is 4, the model illustrated in FIG. 9 becomes the one as illustrated in FIG. 10. The virtual divisor number is set up taking into account the amount of movement v of the object corresponding to the foreground within the shutter time 2 ts.

The amount of movement v indicates a variation in the position of the image corresponding to the moving object in units of pixel spacing. For example, when the image of the object corresponding to the foreground moves and appears spaced apart by four pixels on a next frame with respect to the original position in one given frame, the amount of movement v of the image of the object corresponding to the foreground is referred to as 4.

For example, the virtual divisor number is set to 4 when the amount of movement of the object is 4, and the duration of time corresponding to the shutter time 2 ts is divided into 4 segments.

The topmost row illustrated in FIG. 10 is a divided segment at the beginning of the opening of a shutter. A second row illustrated in FIG. 10 is a divided segment that comes second from the opening of the shutter. A third row illustrated in FIG. 10 is a divided segment that comes third from the opening of the shutter. A fourth row illustrated in FIG. 10 is a divided segment that comes fourth from the opening of the shutter.

The shutter time 2 ts segmented in response to the amount of movement v is also referred to as shutter time 2 ts/v.

When the object corresponding to the foreground is still, the light incident on the sensor remains unchanged. The foreground component F01/v equals a value which is obtained by dividing the pixel value F01 by the virtual divisor number. Similarly, when the object corresponding to the foreground is still, the foreground component F02/v equals a value that is obtained by dividing the pixel value F02 by the virtual divisor number, the foreground component F03/v equals a value that is obtained by dividing the pixel value F03 by the virtual divisor number, and the foreground component F04/v equals a value that is obtained by dividing the pixel value F04 by the virtual divisor number.

When the object corresponding to the background is still, the light incident on the sensor remains unchanged, and the background component B01/v equals a value that is obtained by dividing the pixel value V01 by the virtual divisor number. Similarly, when the object corresponding to the background is still, the background component B02/v equals a value that is obtained by dividing the pixel value B02 by the virtual divisor number, the background component B03/v equals a value that is obtained by dividing the pixel value B03 by the virtual divisor number, and the background component B04/v equals a value that is obtained by dividing the pixel value B04 by the virtual divisor number.

In other words, when the object corresponding to the foreground is still, light, incident on the sensor and corresponding to the object of the foreground, remains unchanged for the duration of time corresponding to the shutter time 2 ts. Therefore, the foreground component F01/v for the shutter time 2 ts/v that comes first from the opening of the shutter, the foreground component F01/v for the shutter time 2 ts/v that comes second from the opening of the shutter, the foreground component F01/v for the shutter time 2 ts/v that comes third from the opening of the shutter, and the foreground component F01/v for the shutter time 2 ts/v that comes fourth from the opening of the shutter become the same value. The same is true of F02/v through F04/v.

When the object corresponding to the background is still, light, incident on the sensor and corresponding to the object of the background, remains unchanged for the duration of time corresponding to the shutter time 2 ts. Therefore, the background component B01/v for the shutter time 2 ts/v that comes first from the opening of the shutter, the background component B01/v for the shutter time 2 ts/v that comes second from the opening of the shutter, the background component B01/v for the shutter time 2 ts/v that comes third from the opening of the shutter, and the background component B01/v for the shutter time 2 ts/v that comes fourth from the opening of the shutter become the same value. The same is true of B02/v through B04/v.

Discussed next is the case in which an object corresponding to the foreground is moving while an object corresponding to the background is stationary.

FIG. 11 is a model diagram illustrating the pixel values of a line of pixels developed in the time axis, wherein a covered background is present with the object corresponding to the foreground moving rightwardly. Referring to FIG. 11, the amount of movement v of the foreground is 4. Since one frame is a short period of time, the assumption that the object corresponding to the foreground is a solid body and moves at a constant speed holds. As shown, the image of the object of the foreground is shifted rightwardly by 4 pixels on the next frame with respect to a given frame.

Referring to FIG. 11, the leftmost pixel to the fourth pixel in the frame from the left-hand side thereof belong to the foreground area. The fifth pixel to the seventh pixel belong to the mixed area, which is a covered background area. Referring to FIG. 11, the rightmost pixel belongs to the background area.

Since the object of the foreground moves in a manner such that it covers the object of the background with the elapse of time, components contained in the pixel values of the pixels belonging to the covered background area change from the background component to the foreground component at a point of time within the duration of the shutter time 2 ts.

The pixel values M enclosed in a solid box as shown in FIG. 11 are expressed by the following equation (6).

$$M = B02/v + B02/v + F07/v + F06/v \quad (6)$$

As will be discussed later using equation (8), a mixture ratio represents a ratio of a background component of the pixel value.

Hereinafter, the mixture ratio is represented by α.

For example, the fifth pixel from the left-hand side contains the background component of a single shutter time 2 ts/v and the foreground component of three shutter times 2 ts/v, and the fifth pixel has a mixture ratio α of ¼. Since the sixth pixel from the left-hand side contains the background component of two shutter times 2 ts/v and the foreground component of two shutter times 2 ts/v, the mixture ratio α thereof is ½. The seventh pixel from the left-hand side contains the background component of three shutter times 2 ts/v and the foreground component of one shutter time 2 ts/v, and the mixture ratio α thereof is ¾.

When it is assumed that the object of the foreground is a solid body and moves at a constant speed so that the image of the foreground appears shifted by 4 pixels on the next frame, the foreground component F07/v of the fourth pixel from the left-hand side as shown in FIG. 11 for the first shutter time 2 ts/v from the opening of the shutter equals the foreground component of the fifth pixel from the left-hand side as shown in FIG. 11 for the second shutter time 2 ts/v from the opening of the shutter. Likewise, the foreground component F07/v equals each of the foreground component of the sixth pixel from the left-hand side as shown in FIG. 11 for the third shutter time 2 ts/v from the opening of the shutter and the foreground component of the seventh pixel from the left-hand side as shown in FIG. 11 for the fourth shutter time 2 ts/v from the opening of the shutter.

When it is assumed that the object of the foreground is a solid body and moves at a constant speed so that the image of the foreground appears shifted by 4 pixels on the next frame, the foreground component F06/v of the third pixel from the left-hand side as shown in FIG. 11 for the first shutter time 2 ts/v from the opening of the shutter equals the foreground component of the fourth pixel from the left-hand side as shown in FIG. 11 for the second shutter time 2 ts/v from the opening of the shutter. Likewise, the foreground component F06/v equals each of the foreground component of the fifth pixel from the left-hand side as shown in FIG. 11 for the third shutter time 2 ts/v from the opening of the shutter and the foreground component of the sixth pixel from the left-hand side as shown in FIG. 11 for the fourth shutter time 2 ts/v from the opening of the shutter.

When it is assumed that the object of the foreground is a solid body and moves at a constant speed so that the image of the foreground appears shifted by 4 pixels on the next frame, the foreground component F05/v of the second pixel from the left-hand side as shown in FIG. 11 for the first shutter time 2 ts/v from the opening of the shutter equals the foreground component of the third pixel from the left-hand side as shown in FIG. 11 for the second shutter time 2 ts/v from the opening of the shutter. Likewise, the foreground component F05/v equals each of the foreground component of the fourth pixel from the left-hand side as shown in FIG. 11 for the third shutter time 2 ts/v from the opening of the shutter and the foreground component of the fifth pixel from the left-hand side as shown in FIG. 12 for the fourth shutter time 2 ts/v from the opening of the shutter.

When it is assumed that the object of the foreground is a solid body and moves at a constant speed so that the image of the foreground appears shifted by 4 pixels on the next frame, the foreground component F04/v of the leftmost pixel as shown in FIG. 11 for the first shutter time 2 ts/v from the opening of the shutter equals the foreground component of the second pixel from the left-hand side as shown in FIG. 11 for the second shutter time 2 ts/v from the opening of the shutter. Likewise, the foreground component F04/v equals each of the foreground component of the third pixel from the left-hand side as shown in FIG. 11 for the third shutter time 2 ts/v from the opening of the shutter and the foreground component of the fourth pixel from the left-hand side as shown in FIG. 11 for the fourth shutter time 2 ts/v from the opening of the shutter.

The foreground area corresponding to the moving object contains a motion blur in this way, and may be thus called a distorted area.

Figure 12:
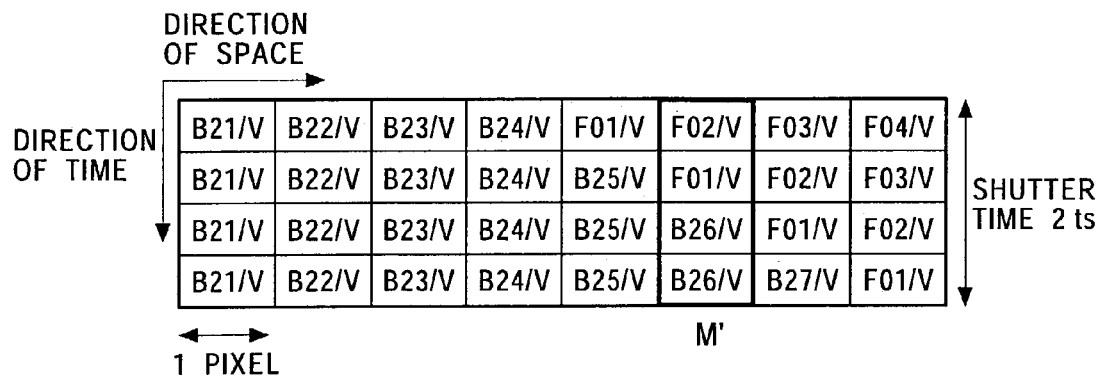
FIG. 12 is a model diagram illustrating the pixel values developed in the time axis for the duration of time corresponding to the shutter time 2 ts, which is divided.

FIG. 12 is a model diagram illustrating the pixel values of a line of pixels developed in the time axis, wherein an uncovered background area is present with the object corresponding to the foreground moving rightwardly. Referring to FIG. 12, the amount of movement v of the foreground is 4. Since one frame is a short period of time, the assumption that the object corresponding to the foreground is a solid body and moves at a constant speed holds. As shown, the image of the object of the foreground is shifted rightwardly by 4 pixels on the next frame with respect to a given frame.

Referring to FIG. 12, the leftmost pixel to the fourth pixel from the left-hand side belong to the background area. The fifth pixel to the seventh pixel belong to the mixed area, which is an uncovered background area. Referring to FIG. 12, the rightmost pixel belongs to the foreground area.

Since the object of the foreground, which has covered the object of thee background, moves with the elapse of time in a manner such that the object of the foreground is removed from the front of the background object, the component contained in the pixel value of a pixel belonging to the uncovered background area changes from the foreground component to the background component at a point of time within the duration of time corresponding to the shutter time 2 ts.

The pixel value M' enclosed in a solid-line box in FIG. 12 is expressed in equation (7).

$$M' = F02/v + F01/v + B26/v + B26/v \quad (7)$$

For example, the fifth pixel from the left-hand side contains the background component of three shutter times 2 ts/v and the foreground component of one shutter time 2 ts/v, and the fifth pixel has a mixture ratio α of ¾. Since the sixth pixel from the left-hand side contains the background component of two shutter times 2 ts/v and the foreground component of two shutter times 2 ts/v, the mixture ratio α thereof is ½. The seventh pixel from the left-hand side contains the background component of one shutter time 2 ts/v and the foreground component of three shutter times 2 ts/v, and the mixture ratio α thereof is ¼.

When equations (6) and (7) are generalized, the pixel value M is expressed by equation (8).

$$M = \alpha \cdot B + \sum_i Fi/v \quad (8)$$

where α is a mixture ratio, B is a pixel value of the background, and Fi/v is a foreground component.

Figure 13:
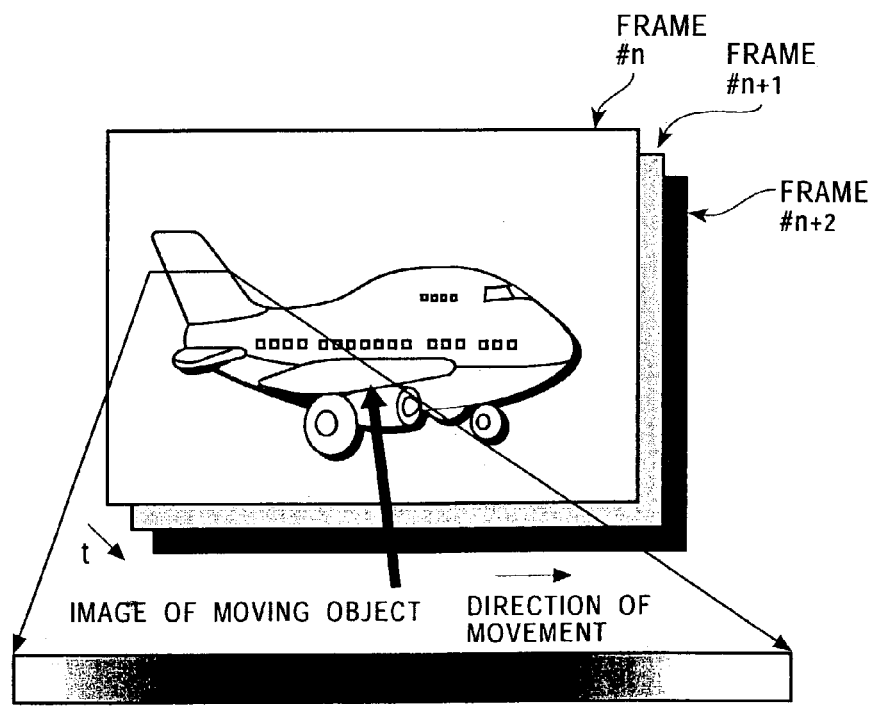
FIG. 13 illustrates extracted pixels of the foreground area, the background area, and the mixed area.

Since it is assumed that the object of the foreground is a solid body and moves at a constant speed, and the amount of movement v is 4, the foreground component F01/v of the fifth pixel from the left-hand side as shown in FIG. 12 for the first shutter time 2 ts/v from the opening of the shutter equals the foreground component of the sixth pixel from the left-hand side as shown in FIG. 13 for the second shutter time 2 ts/v from the opening of the shutter. Likewise, the foreground component F01/v of the seventh pixel from the left-hand side as shown in FIG. 12 for the third shutter time 2 ts/v from the opening of the shutter equals the foreground component of the eighth pixel from the left-hand side as shown in FIG. 12 for the fourth shutter time 2 ts/v from the opening of the shutter.

Since it is assumed that the object of the foreground is a solid body and moves at a constant speed, and the amount of movement v is 4, the foreground component F02/v of the sixth pixel from the left-hand side as shown in FIG. 12 for the first shutter time 2 ts/v from the opening of the shutter equals the foreground component of the seventh pixel from the left-hand side as shown in FIG. 12 for the second shutter time 2 ts/v from the opening of the shutter. Likewise, the foreground component F02/v equals the foreground component of the eighth pixel from the left-hand side as shown in FIG. 12 for the third shutter time 2 ts/v from the opening of the shutter.

Since it is assumed that the object of the foreground is a solid body and moves at a constant speed, and the amount of movement v is 4, the foreground component F03/v of the seventh pixel from the left-hand side as shown in FIG. 12 for the first shutter time 2 ts/v from the opening of the shutter equals the foreground component of the eighth pixel from the left-hand side as shown in FIG. 12 for the second shutter time 2 ts/v from the opening of the shutter.

Referring to FIG. 10 through FIG. 12, the virtual divisor number is 4, but the divisor number may respond to the amount movement v. The amount of movement v, in turn, is typically responsive to the speed of movement of the object of the foreground. For examples when the object of the foreground is moving in a manner such that it rightwardly appears by 4 pixels on the next frame with respect to a certain frame, the amount of movement v of the object is 4. The virtual divisor number is thus set to be 4 in response to the amount of movement v. Similarly, when the object of the foreground is moving in a manner such that it leftwardly appears by 6 pixels on the next frame with respect to a certain frame, the amount of movement v of the object is 6. The virtual divisor number is thus set to be 6 in response to the amount of movement v.

Figure 14:
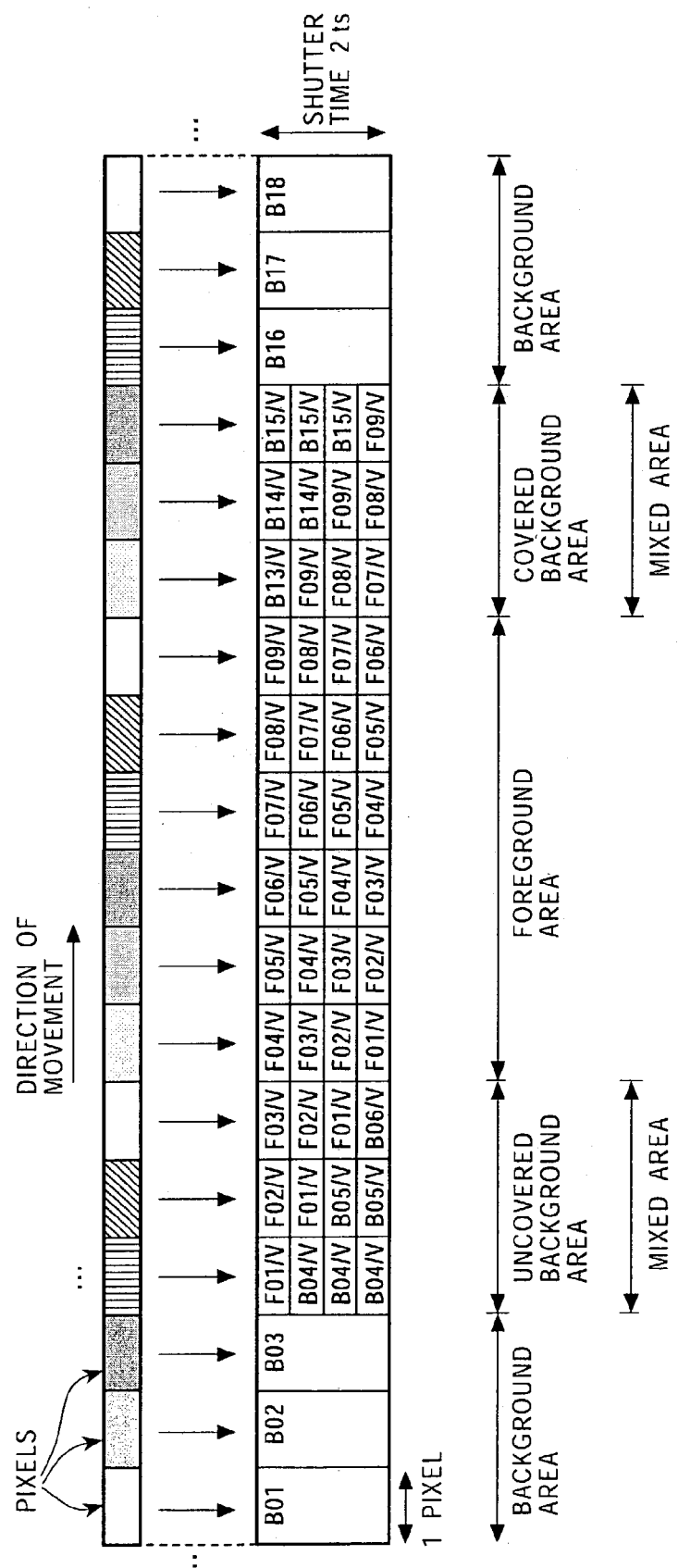
FIG. 14 illustrates the relationship between the pixels and the model in which the pixel values are developed in the time axis.

FIG. 13 and FIG. 14 illustrate the relationship between the foreground area, the background area, and the mixed area composed of the covered background portion and the uncovered background portion, described above, and the foreground component and the background component responsive to the segmented shutter time.

FIG. 13 illustrates the pixels of the foreground area, the background area, and the mixed area extracted from the image of the foreground corresponding to the object moving in front of the stationary background. As shown, the object of the foreground horizontally moves with respect to the screen.

A frame #n+1 is a frame subsequent to a frame #n, and a frame #n+2 is a frame subsequent to the frame #n+1.

FIG. 14 illustrates a model in which the pixel values of pixels are developed in the time axis, wherein the pixels are extracted from the foreground area, the background area, and the mixed area from any of the frame #n through the frame #n+2, and the amount of movement v is determined to be 4.

Since the object of the foreground moves, the pixel values in the foreground area include four different foreground components corresponding to the shutter times 2 ts/v. For example, the leftmost one of the pixels in the foreground area shown in FIG. 14 includes F01/v, F02/v, F03/v, and F04/v. In other words, the pixels in the foreground area contains a motion blur.

The object of the background remains still, and light incident on the sensor and corresponding to the background remains unchanged throughout the duration of time corresponding to the shutter time 2 ts. In this case, the pixel value of the background area includes no motion blur.

The pixel values of the pixels belonging to the mixed area formed of the covered background portion or the uncovered background portion include the foreground component and the background component.

Discussed next is a model in which pixels are consecutively arranged in a line in each of a plurality of frames and pixel values of the pixels at the same positions across the frames are developed in time axis when the image of an object is moving. For example, when the image of the object is horizontally moving with respect to the screen, a line of pixels on the screen is selected as the line of consecutively arranged pixels.

Figure 15:
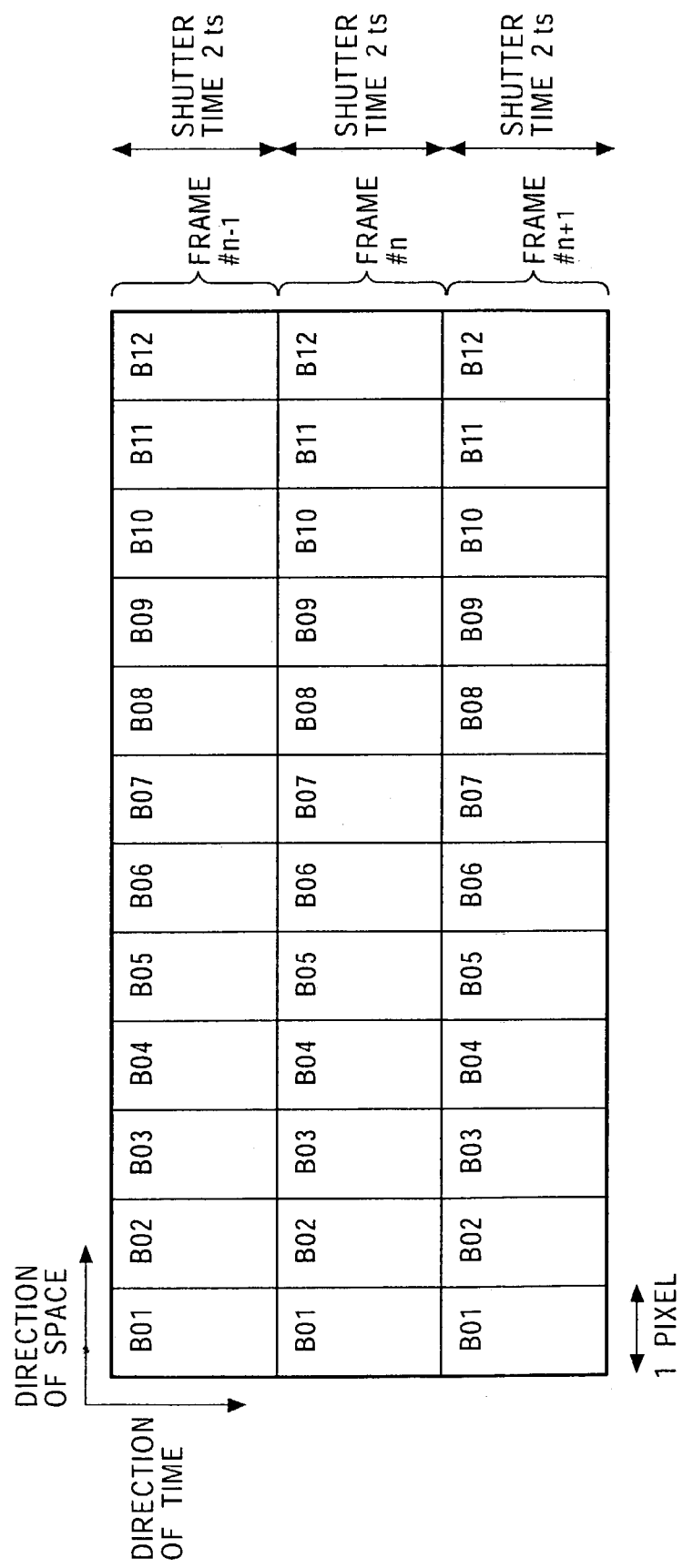
FIG. 15 is a model diagram illustrating the pixel values developed in the time axis for a duration of time corresponding to the shutter time 2 ts, which is divided.

FIG. 15 is a model diagram illustrating the pixel values of a line of adjacent pixels at the same position across the three frames developed in time axis, wherein the pixels form an image of the object of the stationary background. A frame #n is a frame subsequent to a frame #n−1, and a frame #n+1 is a frame subsequent to the frame #n. The same designation applies to the other frames.

Referring to FIG. 15, pixel values B01 through B12 are the pixel values of the pixels corresponding to the stationary background object. Since the background object remains still, the pixel values of the corresponding pixels remain unchanged from the frame #n−1 through the frame #n+1. The pixel in the frame #n and the pixel in the frame #n+1 at the same position as that of the pixel having a pixel value of B05 in the frame #n−1 respectively have the pixel value B05.

Figure 16:
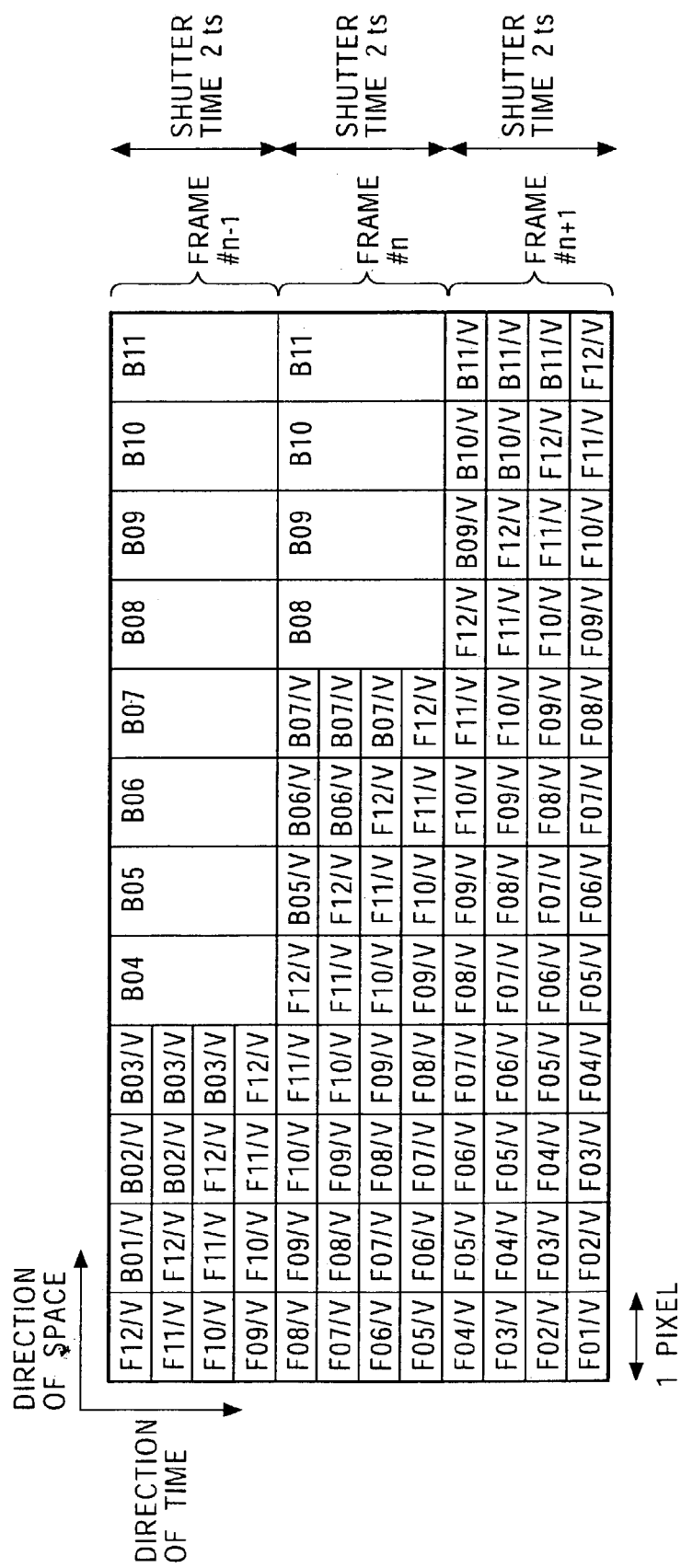
FIG. 16 is a model diagram illustrating the pixel values developed in the time axis for a duration of time corresponding to the shutter time 2 ts, which is divided.

FIG. 16 is a model diagram illustrating the pixel values of a line of pixels at the same position across three frames developed in time axis, in which the object of a still background and the object of a foreground moving rightwardly as shown are captured. The model illustrated in FIG. 16 contains a covered background portion.

Since it is assumed that the foreground object is a solid body, and moves at a constant speed, and the image of the foreground appears rightwardly by 4 pixels on the next frame as shown in FIG. 16, the amount of movement v is 4, and the virtual divisor number is thus 4.

For example, the foreground component of the leftmost pixel in the frame #n−1 as shown in FIG. 16 for the first shutter time 2 ts/v after the opening of the shutter is F12/v, and the foreground component of the second pixel from the left-hand side as shown in FIG. 16 for the second shutter time 2 ts/v after the opening of the shutter is also F12/v. The foreground component of the third pixel from the left-hand side as shown in FIG. 16 for the third shutter time 2 ts/v after the opening of the shutter and the foreground component of the fourth pixel from the left-hand side as shown in FIG. 16 for the fourth shutter time 2 ts/v after the opening of the shutter become F12/v.

The foreground component of the leftmost pixel in the frame #n−1 as shown in FIG. 16 for the second shutter time 2 ts/v after the opening of the shutter is F11/v, and the foreground component of the second pixel from the left-hand side as shown in FIG. 16 for the third shutter time 2 ts/v after the opening of the shutter is also F11/v. The foreground component of the third pixel from the left-hand side as shown in FIG. 16 for the fourth shutter time 2 ts/v after the opening of the shutter becomes F11/v.

The foreground component of the leftmost pixel in the frame #n−1 as shown in FIG. 16 for the third shutter time 2 ts/v after the opening of the shutter is F10/v, and the foreground component of the second pixel from the left-hand side as shown in FIG. 16 for the fourth shutter time 2 ts/v after the opening of the shutter is also F10/v. The foreground component of the leftmost pixel in the frame #n−1 as shown in FIG. 16 for the fourth shutter time 2 ts/v after the opening of the shutter becomes F09/v.

Since the background object is still, the background component of the second pixel in the frame #n−1 from the left-hand side as shown in FIG. 16 for the first shutter time 2 ts/v is B01/v. The background object of the third pixel from the left-hand side of the frame #n−1 as shown in FIG. 16 for the second shutter time after the opening of the shutter is B02/v. The background object of the fourth pixel from the left-hand side of the frame #n−1 as shown in FIG. 16 for the first through third shutter times after the opening of the shutter is B03/v.

In the frame #n−1 as illustrated in FIG. 16, the leftmost pixel falls within the foreground area, and the second through fourth pixels from the left-hand side fall within the mixed area which is a covered background portion.

In the frame #n−1 as illustrated in FIG. 16, the fifth through twelfth pixels, falling within the background area, respectively have pixel values of B04 through B11.

In the frame #n as illustrated in FIG. 16, the leftmost through fifth pixels fall within the foreground area. In the foreground area of the frame #n, the foreground component for the shutter time 2 ts/v is one of F05/v through F12/v.

Since it is assumed that the foreground object is a solid body and moves at a constant speed and the image of the foreground moves and rightwardly appears on the next frame by 4 pixels apart from the original position in any given frame, the foreground component of the fifth pixel from the left-hand side of the frame #n as shown in FIG. 16 for the first shutter time 2 ts/v after the opening of the shutter is F12/v, and the foreground component of the sixth pixel from the left-hand side as shown in FIG. 16 for the second shutter time 2 ts/v after the opening of the shutter is also F12/v. The foreground component of the seventh pixel from the left-hand side as shown in FIG. 16 for the third shutter time 2 ts/v after the opening of the shutter and the foreground component of the eighth pixel from the left-hand side as shown in FIG. 16 for the fourth shutter time 2 ts/v after the opening of the shutter are F12/v.

The foreground component of the fifth pixel from the left-hand side of the frame #n as shown in FIG. 16 for the second shutter time 2 ts/v after the opening of the shutter is F11/v, and the foreground component of the sixth pixel from the left-hand side as shown in FIG. 16 for the third shutter time 2 ts/v after the opening of the shutter is also F11/v. The foreground component of the seventh pixel from the left-hand side as shown in FIG. 16 for the fourth shutter time 2 ts/v after the opening of the shutter is F11/v.

The foreground component of the fifth pixel from the left-hand side of the frame #n as shown in FIG. 16 for the third shutter time 2 ts/v after the opening of the shutter is F10/v, and the foreground component of the sixth pixel from the left-hand side as shown in FIG. 16 for the fourth shutter time 2 ts/v after the opening of the shutter is also F10/v. The foreground component of the fifth pixel from the left-hand side as shown in FIG. 16 for the fourth shutter time 2 ts/v after the opening of the shutter is F09/v.

Since the object of the background is stationary, the background component of the sixth pixel from the left-hand side of the frame #n as shown in FIG. 16 for the first shutter time 2 ts/v after the opening of the shutter is B05/v. The background component of the seventh pixel from the left-hand side of the frame #n as shown in FIG. 16 for the first and second shutter times 2 ts/v after the opening of the shutter is B06/v. The background component of the eighth pixel from the left-hand side of the frame #n as shown in FIG. 16 for the first through third shutter times 2 ts/v after the opening of the shutter is B07/v.

In the frame #n shown in FIG. 16, the sixth through eighth pixels from the left-hand side fall within the mixed area which is a covered background area.

In the frame #n shown in FIG. 16, the ninth through twelfth pixels, falling within the background area, have respectively B08 through B11.

In the frame #n+1 shown in FIG. 16, the leftmost through ninth pixels from the left-hand side fall within the foreground area. In the foreground area of the frame #n+1, the foreground component for the shutter time 2 ts/v is one of F01/v through F12/v.

Since it is assumed that the foreground object is a solid body and moves at a constant speed and the image of the foreground moves and then rightwardly appears on the next frame by 4 pixels from the original position in any given frame, the foreground component of the ninth pixel from the left-hand side of the frame #n+1 as shown in FIG. 16 for the first shutter time 2 ts/v after the opening of the shutter is F12/v, and the foreground component of the tenth pixel from the left-hand side as shown in FIG. 16 for the second shutter time 2 ts/v after the opening of the shutter is also F12/v. The foreground component of the eleventh pixel from the left-hand side as shown in FIG. 16 for the third shutter time 2 ts/v after the opening of the shutter and the foreground component of the twelfth pixel from the left-hand side as shown in FIG. 16 for the fourth shutter time 2 ts/v after the opening of the shutter are F12/v.

The foreground component of the ninth pixel from the left-hand side of the frame #n+1 as shown in FIG. 16 for the second shutter time 2 ts/v after the opening of the shutter is F11/v, and the foreground component of the tenth pixel from the left-hand side as shown in FIG. 16 for the third shutter time 2 ts/v after the opening of the shutter is also F11/v. The foreground component of the eleventh pixel from the left-hand side as shown in FIG. 16 for the fourth shutter time 2 ts/v after the opening of the shutter is F11/v.

The foreground component of the ninth pixel from the left-hand side of the frame #n+1 as shown in FIG. 16 for the third shutter time 2 ts/v after the opening of the shutter is F10/v, and the foreground component of the tenth pixel from the left-hand side as shown in FIG. 16 for the fourth shutter time 2 ts/v after the opening of the shutter is also F10/v, The foreground component of the ninth pixel from the left-hand side of the frame #n+1 as shown in FIG. 16 for the fourth shutter time 2 ts/v after the opening of the shutter is F09/v.

Since the object of the background is stationary, the background component of the tenth pixel from the left-hand side of the frame #n+1 as shown in FIG. 16 for the first shutter time 2 ts/v after the opening of the shutter is B09/v. The background component of the eleventh pixel from the left-hand side of the frame #n+1 as shown in FIG. 16 for the first and second shutter times 2 ts/v after the opening of the shutter is B10/v. The background component of the twelfth pixel from the left-hand side of the frame #n+1 as shown in FIG. 16 for the first through third shutter times 2 ts/v after the opening of the shutter is B11/v.

In the frame #n+1 shown in FIG. 16, the tenth through twelfth pixels from the left-hand side fall within the mixed area which is a covered background area.

Figure 17:
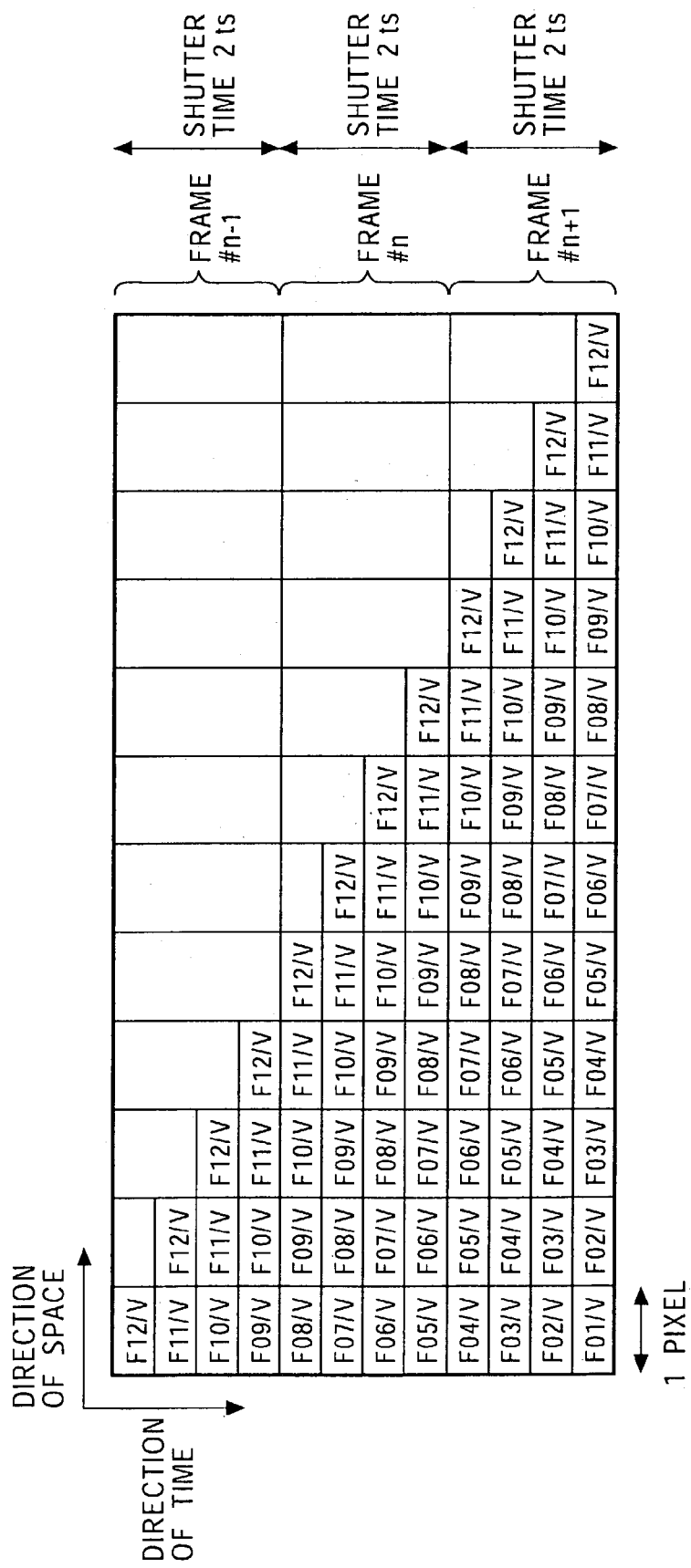
FIG. 17 is a model diagram illustrating the pixel values developed in the time axis for a duration of time corresponding to the shutter time 2 ts, which is divided.

FIG. 17 is a model diagram of an image in which the foreground component is extracted from the pixel values illustrated in FIG. 16.

Figure 18:
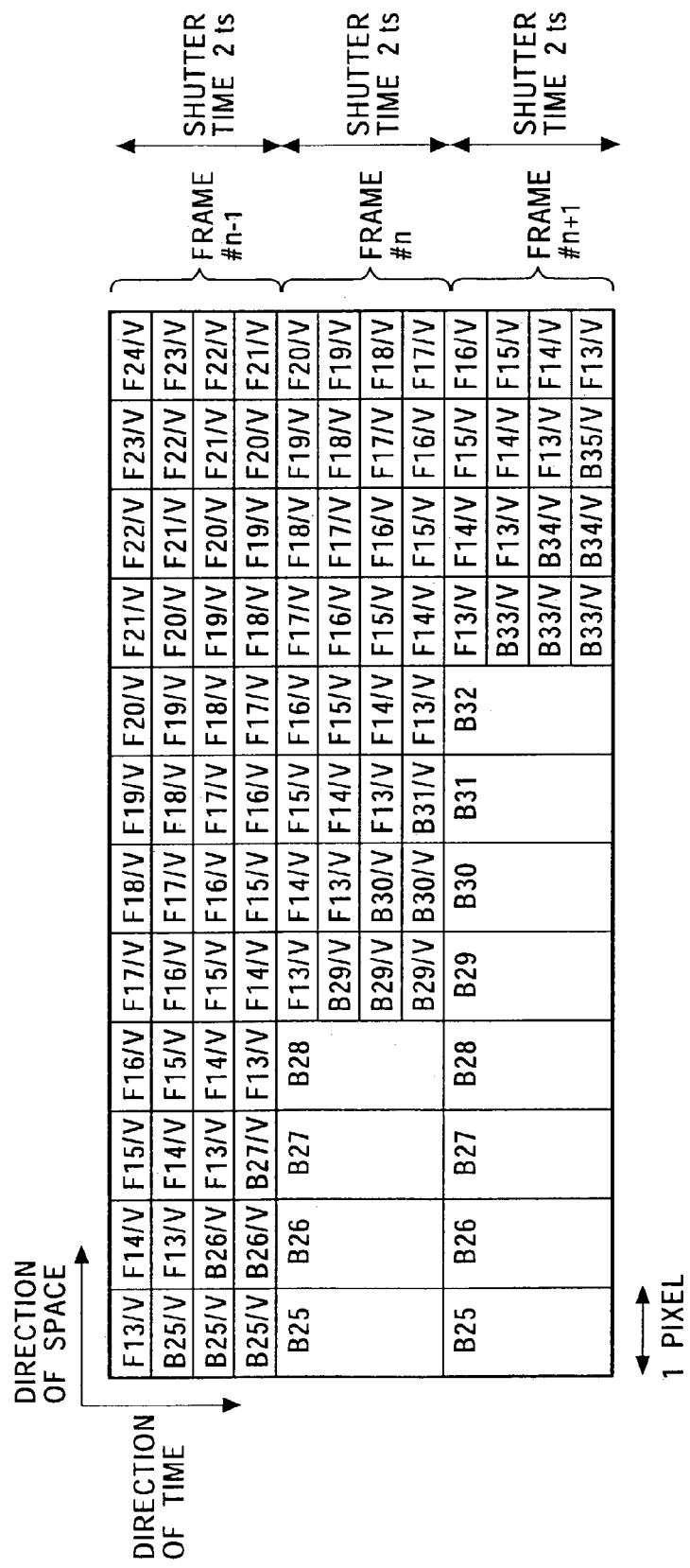
FIG. 18 is a model diagram illustrating the pixel values developed in the time axis for a duration of time corresponding to the shutter time 2 ts, which is divided.

FIG. 18 is a model diagram illustrating the pixel values of a line of pixels at the same position across three frames developed in time axis, wherein the object of a still background and the object of a foreground moving rightwardly as shown are captured. The model illustrated in FIG. 18 contains an uncovered background area.

It is assumed in FIG. 18 that the foreground object is a solid body, and moves at a constant speed. Since the image of the foreground moves and rightwardly appears by 4 pixels on the next frame, the amount of movement v is 4.

For example, the foreground component of the leftmost pixel in the frame #n−1 as shown in FIG. 18 for the first shutter time 2 ts/v after the opening of the shutter is F13/v, and the foreground component of the second pixel from the left-hand side as shown in FIG. 18 for the second shutter time 2 ts/v after the opening of the shutter is also F13/v. The foreground component of the third pixel from the left-hand side as shown in FIG. 18 for the third shutter time 2 ts/v after the opening of the shutter and the foreground component of the fourth pixel from the left-hand side as shown in FIG. 18 for the fourth shutter time 2 ts/v after the opening of the shutter become F13/v.

The foreground component of the second pixel from the left-hand side of the frame #n−1 as shown in FIG. 18 for the first shutter time 2 ts/v after the opening of the shutter is F14/v, and the foreground component of the third pixel from the left-hand side as shown in FIG. 18 for the second shutter time 2 ts/v after the opening of the shutter is also F14/v. The foreground component of the third pixel from the left-hand side as shown in FIG. 18 for the first shutter time 2 ts/v after the opening of the shutter becomes F15/v.

Since the background object is still, the background component of the leftmost pixel in the frame #n−1 as shown in FIG. 18 for the second through fourth shutter times 2 ts/v is B25/v. The background object of the second pixel from the left-hand side of the frame #n−1 as shown in FIG. 18 for the third and fourth shutter times 2 ts/v after the opening of the shutter is B26/v. The background object of the third pixel from the left-hand side of the frame #n−1 as shown in FIG. 18 for the fourth shutter time 2 ts/v after the opening of the shutter is B27/v.

In the frame #n−1 as illustrated in FIG. 18, the leftmost through third pixels fall within the mixed area, which is the uncovered background area.

In the frame #n+1 as illustrated in FIG. 18, the fourth through twelfth pixels fall within the foreground area. The foreground component in the frame is one of F13/v through F24/v.

In the frame #n as illustrated in FIG. 18, the leftmost through fourth pixels fall within the background area, and the pixel values thereof are respectively B25 through B28.

Since it is assumed that the foreground object is a solid body and moves at a constant speed and the image of the foreground moves and rightwardly appears on the next frame by 4 pixels from the original position in any given frame, the foreground component of the fifth pixel from the left-hand side of the frame #n as shown in FIG. 18 for the first shutter time 2 ts/v after the opening of the shutter is F13/v and the foreground component of the sixth pixel from the left-hand side as shown in FIG. 18 for the second shutter time 2 ts/v after the opening of the shutter is also F13/v. The foreground component of the seventh pixel from the left-hand side as shown in FIG. 18 for the third shutter time 2 ts/v after the opening of the shutter and the foreground component of the eighth pixel from the left-hand side as shown in FIG. 18 for the fourth shutter time 2 ts/v after the opening of the shutter are F13/v.

The foreground component of the sixth pixel from the left-hand side of the frame #n as shown in FIG. 18 for the first shutter time 2 ts/v after the opening of the shutter is F14/v, and the foreground component of the seventh pixel from the left-hand side as shown in FIG. 18 for the second shutter time 2 ts/v after the opening of the shutter is also F14/v. The foreground component of the eighth pixel from the left-hand side as shown in FIG. 18 for the first shutter time 2 ts/v after the opening of the shutter is F15/v.

Since the object of the background is stationary, the background component of the fifth pixel from the left-hand side of the frame #n as shown in FIG. 18 for the second through fourth shutter times 2 ts/v after the opening of the shutter is B29/v. The background component of the sixth pixel from the left-hand side of the frame #n as shown in FIG. 18 for the third and fourth shutter times 2 ts/v after the opening of the shutter is B30/v. The background component of the seventh pixel from the left-hand side of the frame #n as shown in FIG. 18 for the fourth shutter time 2 ts/v after the opening of the shutter is B31/v.

In the frame #n shown in FIG. 18, the fifth through seventh pixels from the left-hand side fall within the mixed area which is an uncovered background area.

In the frame #n shown in FIG. 18, the eighth through twelfth pixels fall within the foreground area. The pixel value in the foreground area in the frame #n for the shutter time 2 ts/v is one of F13/v through F20/v.

The leftmost through eighth pixels in the frame #n+1 as shown in FIG. 18 belong to the background area, and the pixel values thereof are respectively B25 through B32.

Since it is assumed that the foreground object is a solid body and moves at a constant speed and the image of the foreground moves and then rightwardly appears on the next frame by 4 pixels from the original position in any given frame, the foreground component of the ninth pixel from the left-hand side of the frame #n+1 as shown in FIG. 18 for the first shutter time 2 ts/v after the opening of the shutter is F13/v, and the foreground component of the tenth pixel from the left-hand side as shown in FIG. 18 for the second shutter time 2 ts/v after the opening of the shutter is also F13/v. The foreground component of the eleventh pixel from the left-hand side as shown in FIG. 18 for the third shutter time 2 ts/v after the opening of the shutter and the foreground component of the twelfth pixel from the left-hand side as shown in FIG. 18 for the fourth shutter time 2 ts/v after the opening of the shutter are F13/v.

The foreground component of the tenth pixel from the left-hand side of the frame #n+1 as shown in FIG. 18 for the first shutter time 2 ts/v after the opening of the shutter is F14/v, and the foreground component of the eleventh pixel from the left-hand side as shown in FIG. 18 for the second shutter time 2 ts/v after the opening of the shutter is also F14/v. The foreground component of the twelfth pixel from the left-hand side as shown in FIG. 18 for the first shutter time 2 ts/v after the opening of the shutter is F15/v.

Since the object of the background is stationary, the background component of the ninth pixel from the left-hand side of the frame #n+1 as shown in FIG. 18 for the second through fourth shutter times 2 ts/v after the opening of the shutter is B33/v. The background component of the tenth pixel from the left-hand side of the frame #n+1 as shown in FIG. 18 for the third and fourth shutter times 2 ts/v after the opening of the shutter is B34/v. The background component of the eleventh pixel from the left-hand side of the frame #n+1 as shown in FIG. 18 for the fourth shutter time 2 ts/v after the opening of the shutter is B35/v.

In the frame #n+1 shown in FIG. 18, the ninth through eleventh pixels from the left-hand side fall within the mixed area which is an uncovered background area.

In the frame #n+1 shown in FIG. 18, the twelfth pixel falls within the foreground area. The foreground component in the foreground area in the frame #n+1 for the shutter time 2 ts/v is one of F13/v through F16/v.

Figure 19:
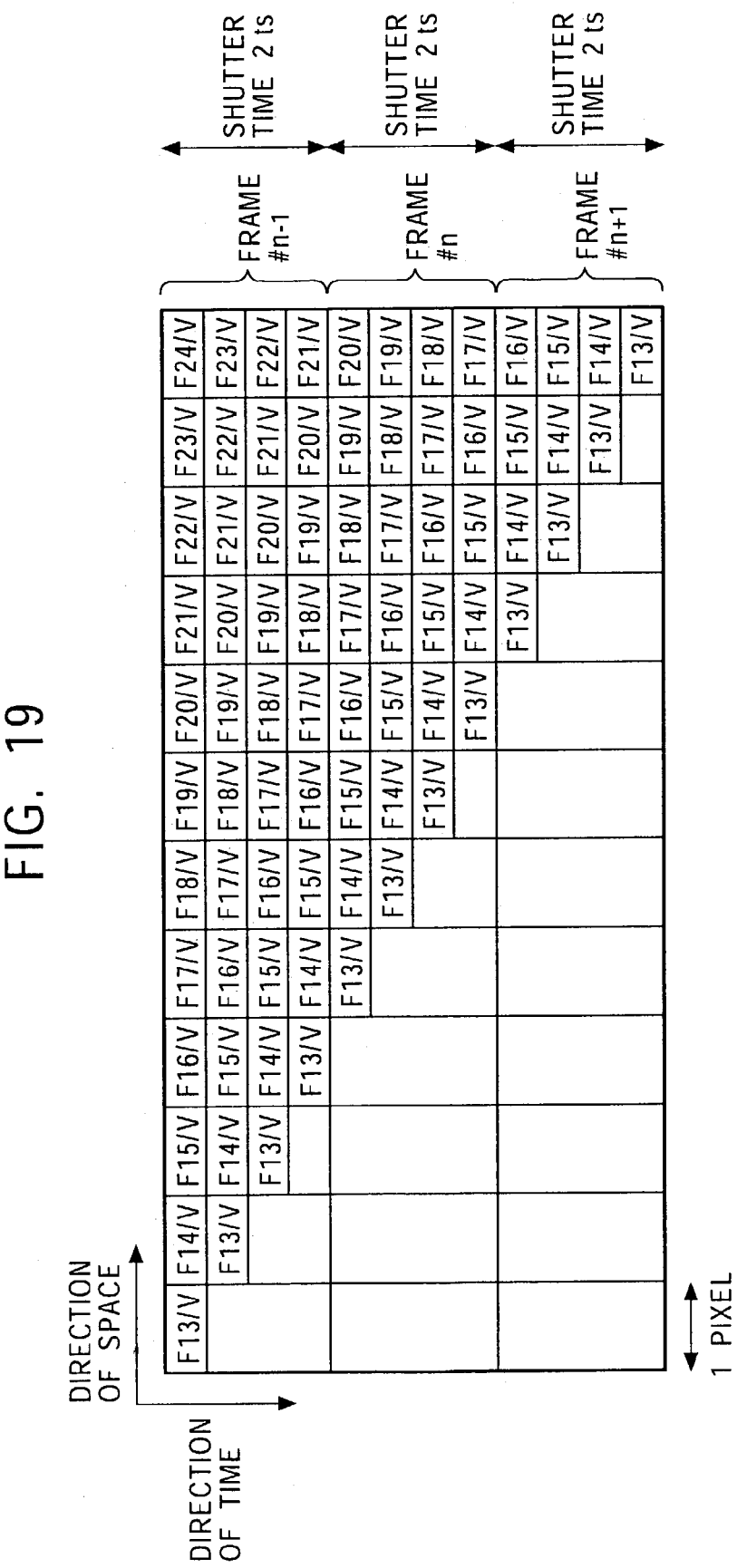
FIG. 19 is a model diagram illustrating the pixel values developed in the time axis for a duration of time corresponding to the shutter time 2 ts, which is divided.

FIG. 19 is a model diagram of an image in which the foreground component is extracted from the pixel values illustrated in FIG. 18.

The process for generating a double-density image in the mixed area is discussed below.

Figure 20:
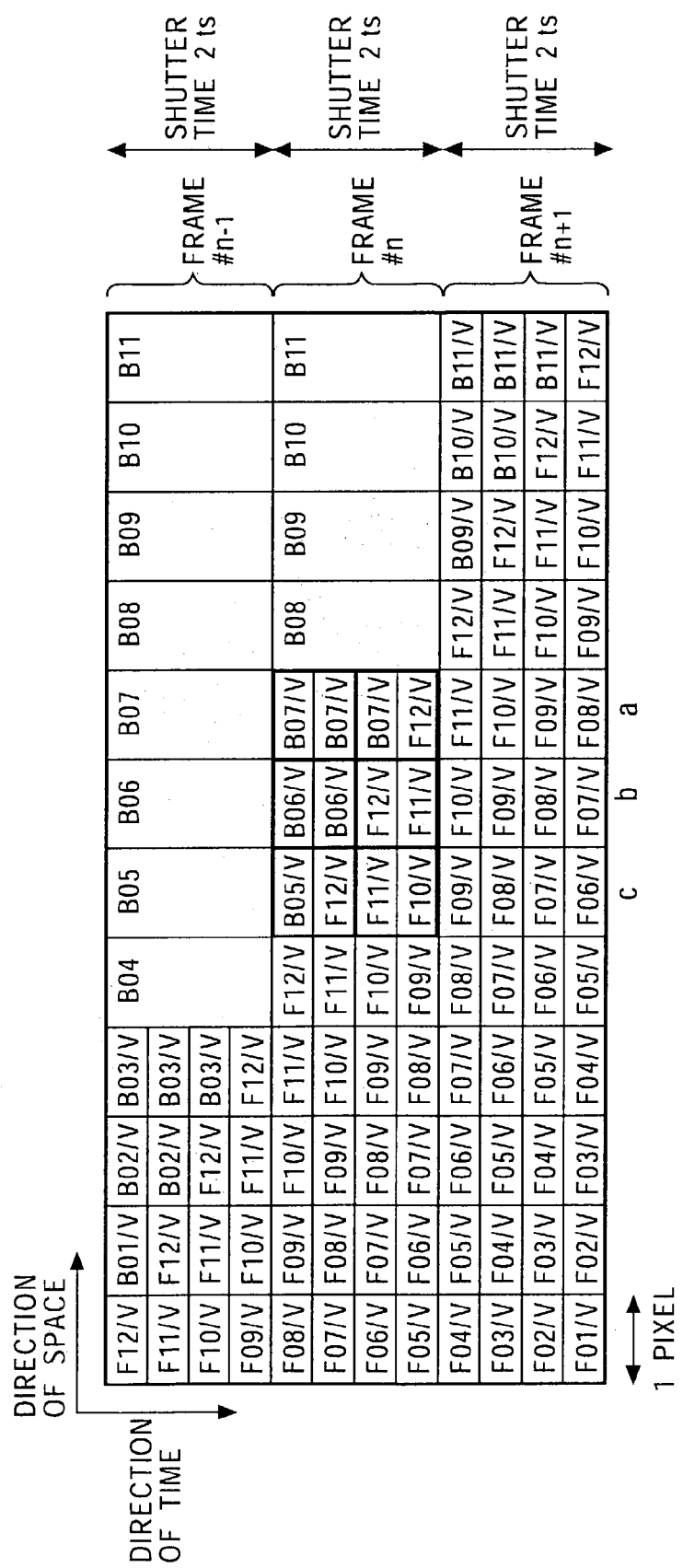
FIG. 20 is a diagram illustrating the process performed on the pixels in the mixed area.

Pixels a through c are within the mixed area in the frame #n in FIG. 20.

The pixel value Ma of the pixel a in the frame #n is expressed in equation (9).

$$Ma = B07/4 + B07/4 + B07/4 + B12/4 \tag{9}$$

The pixel value Ma1 and the pixel value Ma2 of the double-density image corresponding to the pixel a are respectively expressed in equation (10) and equation (11). In equations (10) and (11), the foreground component or the background component is multiplied by a coefficient 2 to adjust gain.

$$Ma1 = 2 \times (B07/4 + B07/4) \tag{10}$$
$$= B07/2 + B07/2$$
$$= B07$$

$$Ma2 = 2 \times (B07/4 + F12/4) \tag{11}$$
$$= B07/2 + F12/2$$

Equation (10) shows that the pixel value B07 of the corresponding pixel in the frame #n−1 needs to be set to the pixel value Ma1 of the double-density image on the background area corresponding to the pixel a in the frame #n.

The pixel value Ma2 of the double-density image on the foreground area corresponding to the pixel a in the frame #n is determined from equation (12), which is obtained by rewriting equation (4) or equation (5).

$$Ma2 = 2 \times Ma - Ma1 \tag{12}$$

Figure 21:
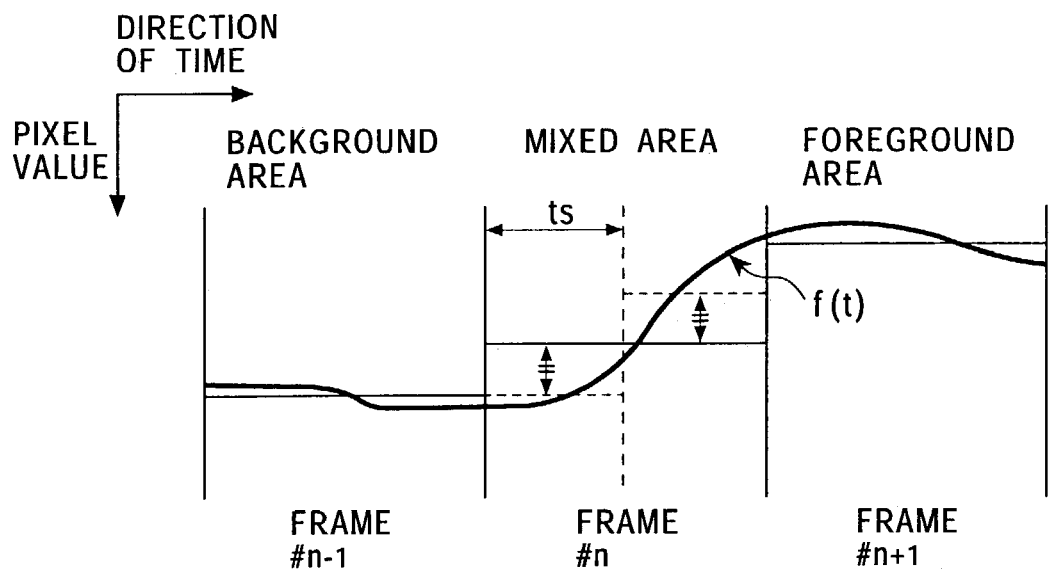
FIG. 21 is a diagram illustrating a chronologically ideal relationship between a pixel in the mixed area and a pixel value thereof.

FIG. 21 is a diagram illustrating the relationship of pixel values of pixels in the mixed area, namely, the pixel value of a pixel having a large background component, a pixel value of the corresponding pixel in a prior frame or a subsequent frame, the pixel value of a double-density image, and a chronologically ideal pixel value.

Horizontal solid lines in FIG. 21 represent the pixel value of the input image. Horizontal broken lines in FIG. 21 represent the pixel values of an image having a double density in the direction of time.

When a pixel in the mixed area in the frame #n contains a more background component, the pixel value of the corresponding pixel in the background area in the frame #n−1 is set as the pixel value of the background of the double density image as shown in FIG. 21. Referring to FIG. 21, the double density image on the background is located in the frame #n−1.

When the pixel in the mixed area in the frame #n has a more background component, the corresponding pixel value of the double-density image on the foreground is calculated from the pixel value of the pixel in the mixed area in the frame #n and the set pixel value of the double-density image on the background based on equation (4) and equation (5). Referring to FIG. 21, the double-density image on the foreground is located in the frame #n+1.

Likewise, the pixel value B06 of the corresponding pixel in the frame #n−1 is set to the pixel value Mb1 of the pixel b in the double-density image on the background as expressed in equation (13). The pixel value Mb2 of the double-density image on the foreground corresponding to the pixel b in the frame #n is calculated from equation (14).

$$Mb1 = 2 \times (B06/4 + B06/4) \tag{13}$$
$$= B06/2 + B06/2$$
$$= B06$$

$$Mb2 = 2 \times Mb - Mb1 \tag{14}$$

The pixel value Mc of the pixel c is expressed in equation (15).

$$Mc = B05/4 + F12/4 + F11/4 + F10/4 \tag{15}$$

The pixel value Mc1 and the pixel value Mc2 of the double-density image corresponding to the pixel c in the frame #n are respectively expressed in equation (16) and equation (17). In equations (16) and (17), the foreground component or the background component is multiplied by a coefficient of 2 to adjust gain.

$$Mc1 = 2 \times (B05/4 + F12/4) \tag{16}$$
$$= B05/2 + F12/2$$

$$Mc2 = 2 \times (F11/4 + F10/4) \tag{17}$$
$$= F11/2 + F10/2$$

Using the spatial correlation of the foreground component, equation (18) holds.

$$F = F11 = F10 = F09 = F08\ F07\ F06 \tag{18}$$

From equation (18), F09/4+F08/4+F07/4+F06/4. The pixel value of the pixel c in the frame #n+1 equals the pixel value F.

Equation (19) thus holds.

$$Mc2 = F11/2 + F10/2 \tag{19}$$
$$= F$$

The pixel value Mc1 of the double-density image on the background corresponding to the pixel c is calculated from equation (20), which is rewritten from equation (4) or equation (5).

$$Mc1 = 2 \times Mc - Mc2 \tag{20}$$

Figure 22:
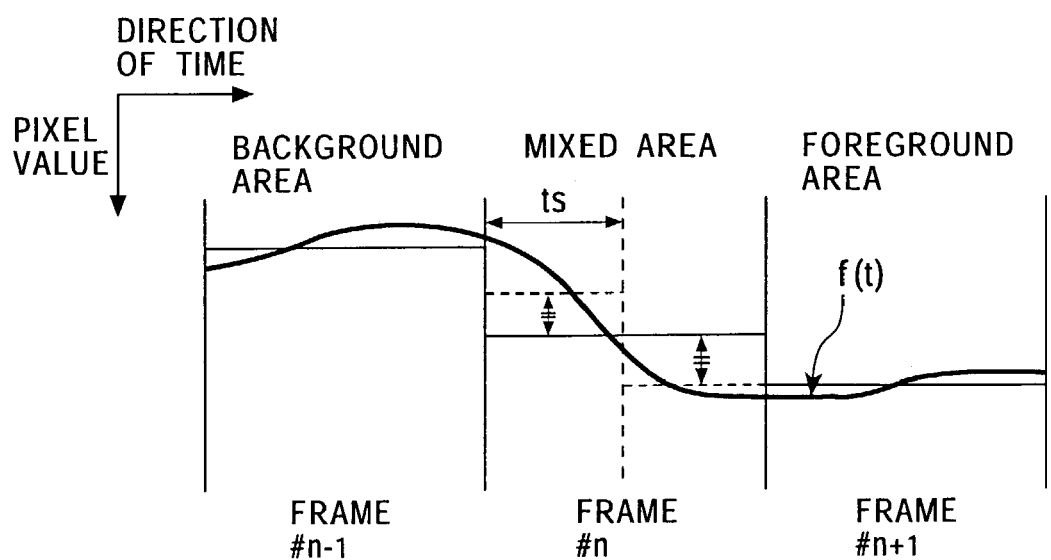
FIG. 22 is a diagram illustrating a chronologically ideal relationship between a pixel in the mixed area and a pixel value.

FIG. 22 is a diagram illustrating the relationship of pixel values of pixels in the mixed area, namely, the pixel value of a pixel having a large foreground component, a pixel value of the corresponding pixel in a prior frame or a subsequent frame, the pixel value of a double-density image, and a chronologically ideal pixel value.

Horizontal solid lines in FIG. 22 represent the pixel value of the input image captured by the sensor. Horizontal broken lines in FIG. 22 represent the pixel values of an image having a double density in the direction of time.

When a pixel in the mixed area in the frame #n contains a more foreground component, the pixel value of the corresponding pixel in the foreground area in the frame #n+1 is set as the pixel value of the foreground of the double density image as shown in FIG. 22. Referring to FIG. 22, the double density image on the foreground is located in the frame #n+1.

When the pixel in the mixed area in the frame #n has a more foreground component, the corresponding pixel value of the double-density image on the background is calculated from the pixel value of the pixel in the mixed area in the frame #n and the set pixel value of the double-density image on the foreground based on equation (4) and equation (5). Referring to FIG. 22, the double-density image on the background is located in the frame #n−1.

When the pixel value of the pixel in the mixed area in the double-density image containing two or three background components with the amount of movement v of 4 is generated, a pixel value of the pixel in the background area in a prior frame or a subsequent frame is set to the pixel value of the double-density image in the background, and the pixel value in the double-density image of the foreground is calculated from equation (4) or equation (5).

When the pixel value of the pixel in the mixed area in the double-density image containing one background component with the amount of movement v of 4 is generated, a pixel value of the pixel in the foreground area in a prior frame or a subsequent frame is set to the pixel value of the double-density image in the foreground, and the pixel value in the double-density image of the background is calculated from equation (4) or equation (5).

Generally speaking, when the pixel in the mixed area has a higher correlation with the corresponding pixel in the background area than with the corresponding pixel in the foreground area, the pixel value of the corresponding pixel in the background area is set as the pixel value of the double-density image in the background, and the pixel value of the double-density image in the foreground is calculated using equation (4) or equation (5) When the pixel in the mixed area has a higher correlation with the corresponding pixel in the foreground area than with the corresponding pixel in the background area, the pixel value of the corresponding pixel in the foreground area is set as the pixel value of the double-density image in the foreground, and the pixel value of the double-density image in the background is calculated using equation (4) or equation (5).

FIG. 25 through FIG. 28 illustrate the results of the process which examines the appropriateness of the process for setting the pixel value having a high correlation to a pixel in half side of a double-density image.

The image with the shutter time ts is averaged over 2 frames, and then an image corresponding to the shutter time 2 ts is thus generated. A difference in frames of the image having the shutter time 2 ts, the image having the shutter time 2 ts, and a difference of frames of the image having the shutter time ts are, compared, based on the generated image having the shutter time 2 ts, and the image having the shutter time ts.

In the processing of the image having the shutter time 2 ts, and the frame difference of the shutter time ts, the image having the shutter time ts corresponds to a pixel having a high correlation in the generation process of the above-referenced double-density image.

Figure 23:
FIG. 23 illustrates the results of the process which examines the appropriateness of the process for setting the pixel value having a high correlation to a pixel in the half side of a double-density image.

FIG. 23 is an image of a frame difference between the images having the shutter time 2 ts.

Figure 24:
FIG. 24 illustrates the results of the process which examines the appropriateness of the process for setting the pixel value having a high correlation to a pixel in the half side of the double-density image.

FIG. 24 is an enlarged view of the image in the mixed area of the frame difference between the images having the shutter, time 2 ts.

Figure 25:
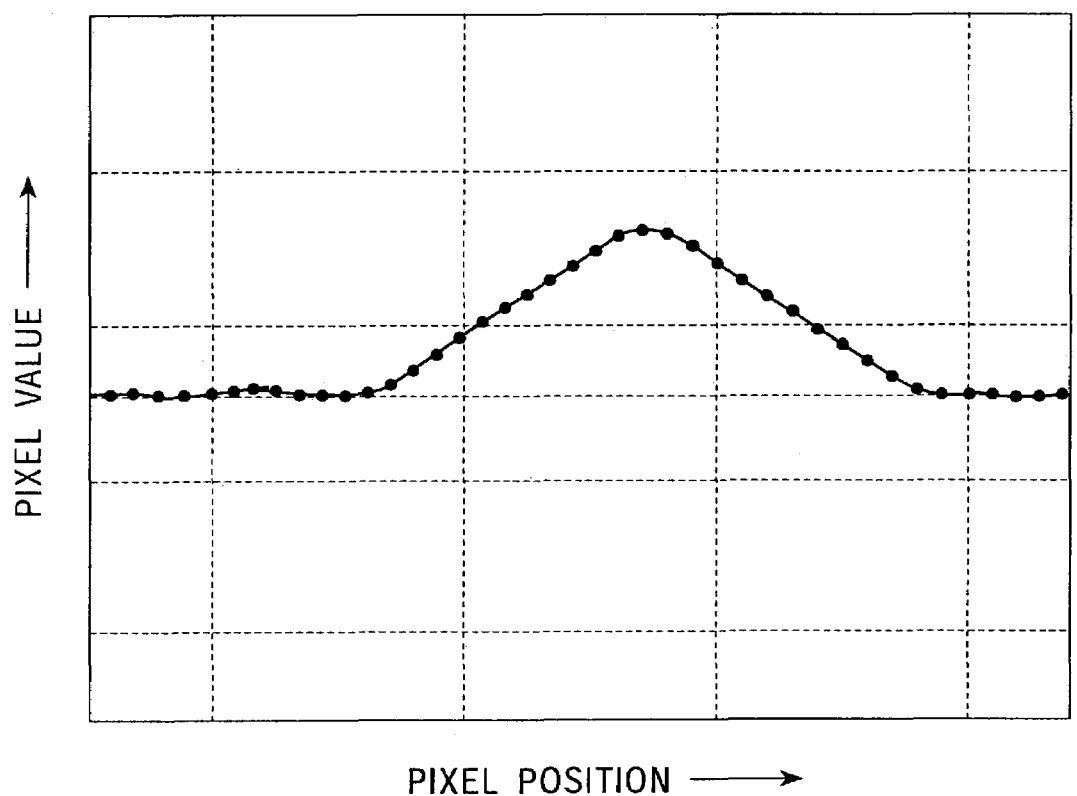
FIG. 25 illustrates the results of the process which examines the appropriateness of the process for setting the pixel value having a high correlation to a pixel in the half side of the double-density image.

FIG. 25 plots a change in the pixel value of a pixel, with respect to a pixel position, in the image in the mixed area of the frame difference between the images having the shutter time 2 ts.

Figure 26:
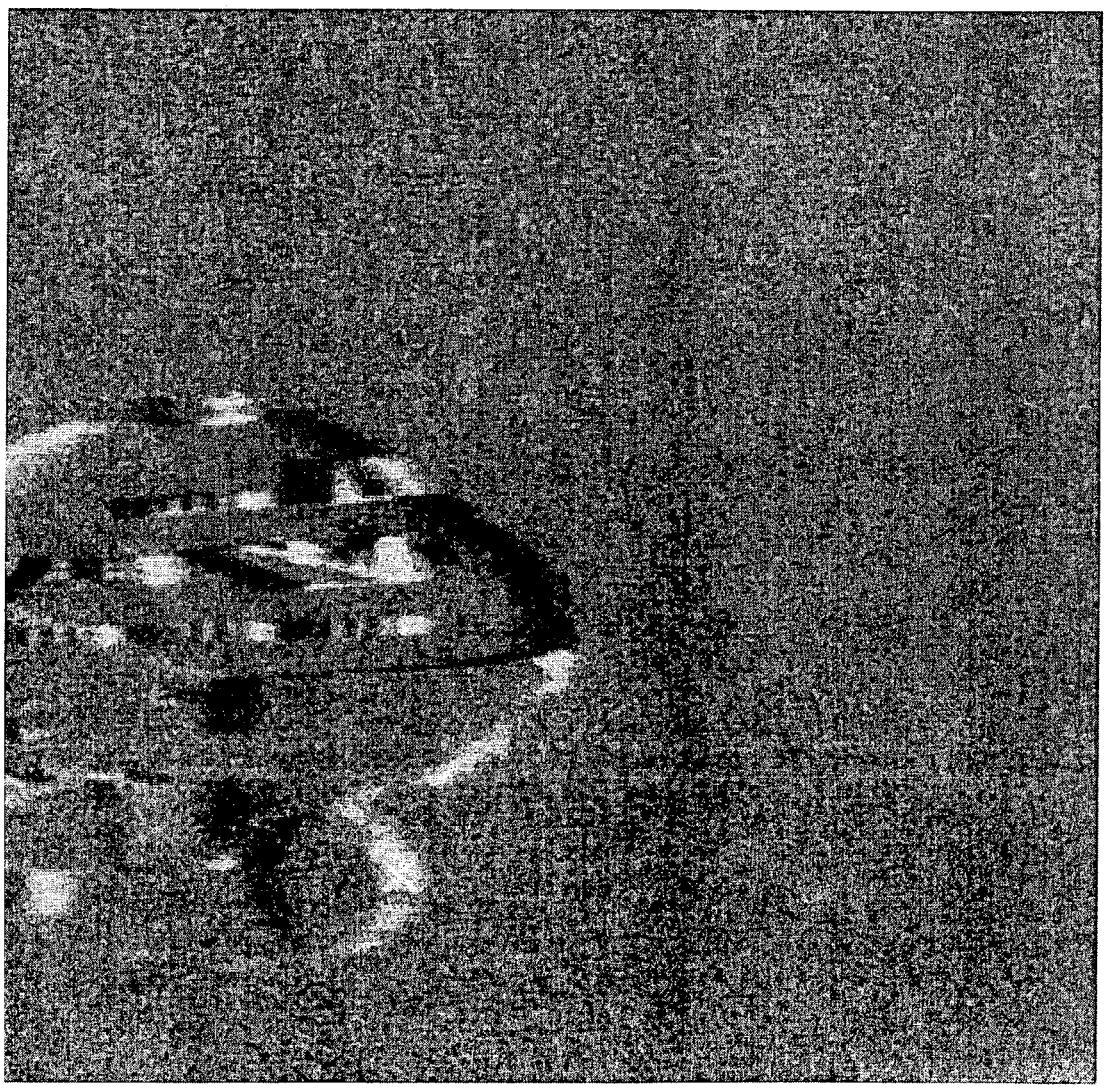
FIG. 26 illustrates the results of the process which examines the appropriateness of the process for setting the pixel value having a high correlation to a pixel in the half side of the double-density image.

FIG. 26 illustrates the image of the frame difference between the image having the shutter time 2 ts and the image having the shutter time ts. In the calculation process of the image having the shutter time 2 ts and the image having the shutter time ts, the difference calculation process between the pixel in the background in the image having the shutter time ts and the target pixel of the image having the shutter time 2 ts is appropriately alternated with the difference calculation process between the pixel in the foreground in the image having the shutter time ts and the target pixel of the image having the shutter time 2 ts.

Figure 27:
FIG. 27 illustrates the results of the process which examines the appropriateness of the process for setting the pixel value having a high correlation to a pixel in the half side of the double-density image.

FIG. 27 is an enlarged view of the image in the mixed area of the frame difference between the image having the shutter time 2 ts and the image having the shutter time ts.

Figure 28:
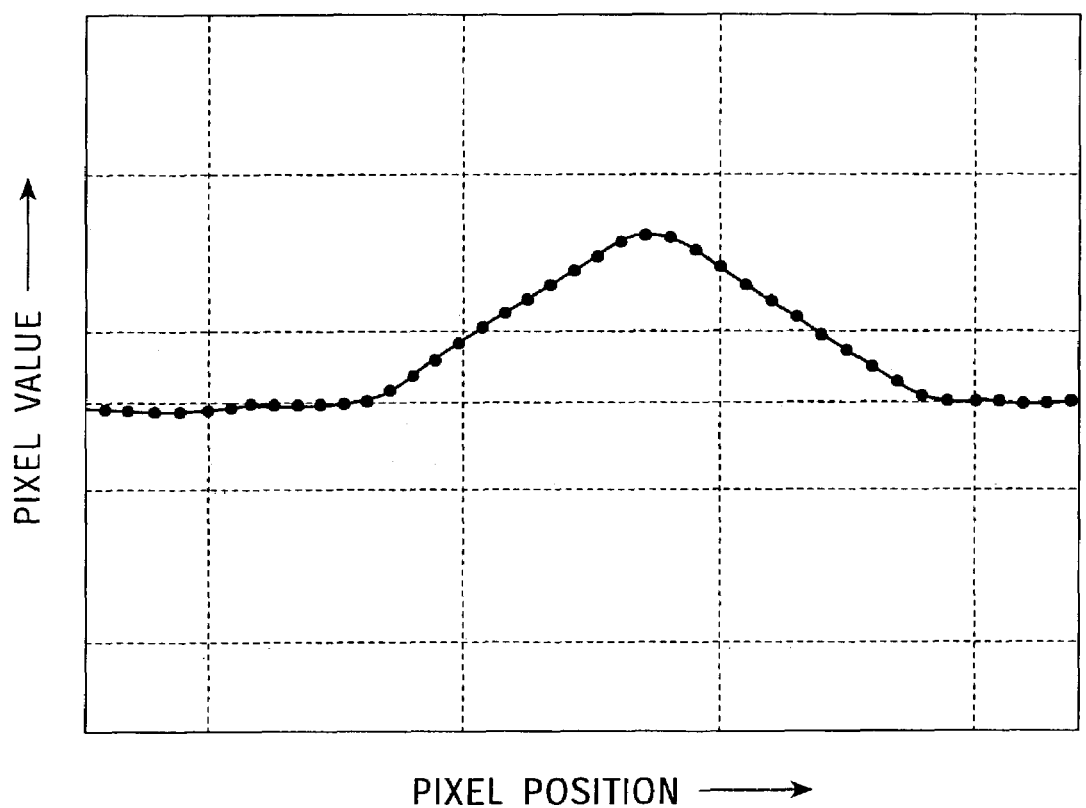
FIG. 28 illustrates the results of the process which examines the appropriateness of the process for setting the pixel value having a high correlation to a pixel in the half side of the double-density image.

FIG. 28 plots a change in the pixel value of the pixel with respect to the pixel position of the pixel in the mixed area of the frame difference between the image having the shutter time 2 ts and the image having the shutter time ts.

Referring to FIG. 23 through FIG. 28, the frame difference of the images having the shutter time 2 ts has approximately the same value as that of the frame difference of the image having the shutter time 2 ts and the corresponding image having the shutter time ts.

For this reason, the process of setting the pixel value having a high correlation to a pixel on the half side of the double-density image, and generating the pixel value on the other half side of the double-density image from the pixel value having the high correlation and the original pixel value results in an image substantially identical to an image which is obtained from images which are captured with the shutter time of the sensor halved.

The process for generating a double-density image based on the pixel in the foreground area is discussed below.

Figure 29:
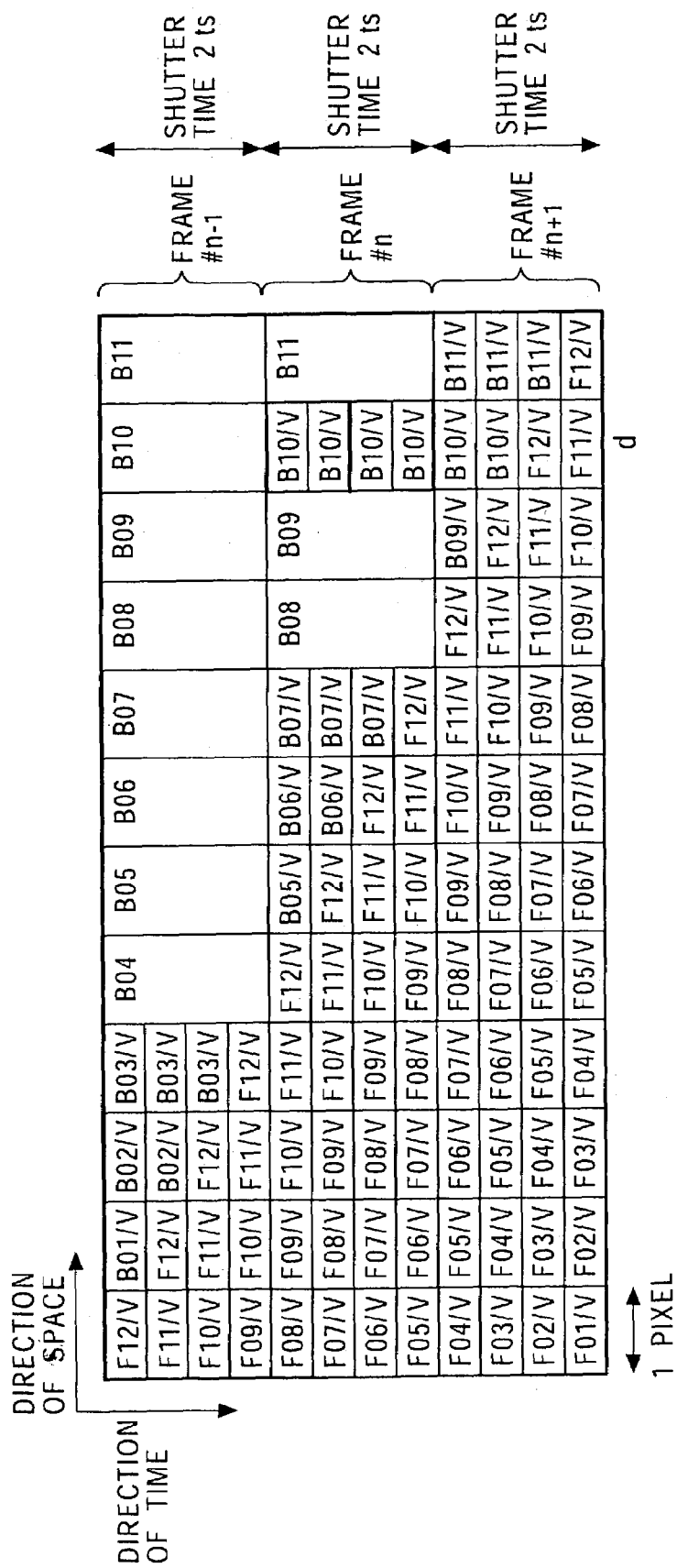
FIG. 29 is a diagram illustrating a process performed on a pixel in the background area.

Referring to FIG. 29, a pixel d is in the background area in the frame #n.

The pixel value Md of the pixel d in the frame #n is expressed in equation (21).

$$Md = B10/4 + B10/4 + B10/4 + B10/4 \quad (21)$$

The pixel value Md1 and the pixel value Md2 in the double-density image for the pixel d are respectively expressed in equations (22) and (23). In each of equations (22) and (23), the background component is multiplied by a coefficient of 2.

$$\begin{aligned} Md1 &= 2 \times (B10/4 + B10/4) \\ &= B10/2 + B10/2 \\ &= B10 \end{aligned} \quad (22)$$

$$\begin{aligned} Md2 &= 2 \times (B10/4 + B10/4) \\ &= B10/2 + B10/2 \\ &= B10 \end{aligned} \quad (23)$$

The pixel value B10 of the corresponding pixel in the frame #n−1 is set to the pixel value Md1 and the pixel value Md2 in the double-density image for the pixel d.

The process for generating a double-density image based on the pixel in the foreground area is discussed below.

When a double-density image is generated based on a pixel in the foreground, a correct pixel value is not obtained from a prior frame or a subsequent frame, the spatial correlation of the foreground component is used. The pixel value of the prior frame or the subsequent frame, whichever has a larger correlation value, is used as a pixel value of any side of the double-density image. Another pixel value of the double-density image is calculated using equation (4) or equation (5).

Figure 30:
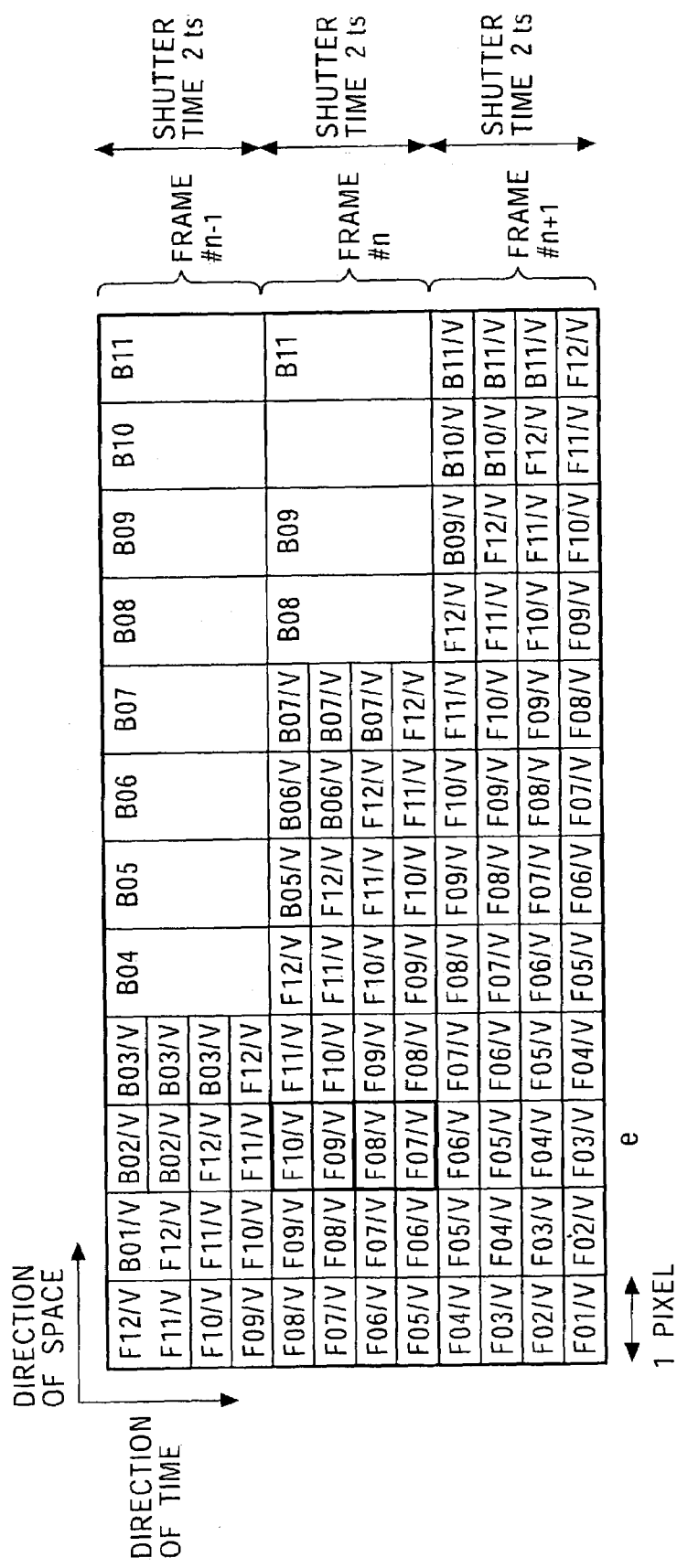
FIG. 30 is a diagram illustrating a process performed on a pixel in the foreground area.

A pixel e falls within the foreground area in the frame #n in FIG. 30.

The pixel value Me of the pixel e in the frame #n is expressed in equation (24).

$$Me = F07/4 + F08/4 + F09/4 + F10/4 \qquad (24)$$

The pixel value Me1 and the pixel value Me2 in the double-density image for the pixel e are respectively expressed in equation (25) and equation (26). In equations (25) and (26), the foreground component is multiplied by a factor of 2 to adjust gain.

$$Me1 = 2 \times (F09/4 + F10/4) \qquad (25)$$
$$\quad = F09/2 + F10/2$$

$$Me2 = 2 \times (F07/4 + F08/4) \qquad (26)$$
$$\quad = F07/2 + F08/2$$

When the pixel e has a higher correlation with the corresponding pixel in the frame #n+1 than with the corresponding pixel in the frame #n−1, equation (27) holds using the spatial correlation of the foreground component.

$$F = F08 = F07 = F06 = F05 = F04 = F03 = \qquad (27)$$

The pixel value of the corresponding pixel in the frame #n+1 is set to the pixel value Me2 in the double-density image for the pixel e as expressed in equation (28).

$$Me2 = F07/2 + F08/2 \qquad (28)$$
$$\quad = F06/4 + F05/4 + F04/4 + F03/4$$
$$\quad = F$$

The another pixel value Me1 in the double-density image for the pixel e is calculated using equation (29), which is rewritten from equation (4) or equation (5).

$$Me1 = 2 \times Me - Me2 \qquad (29)$$

Figure 31:
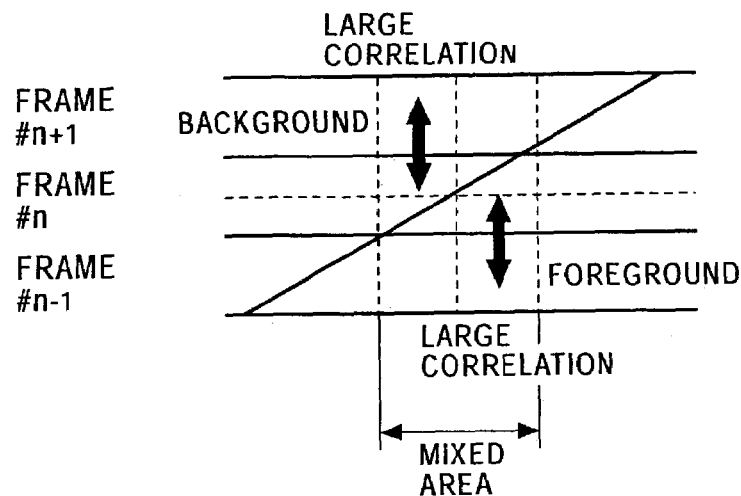
FIG. 31 is a diagram illustrating a process performed on a pixel in the mixed area.

In this way, the image processing apparatus generates the double-density image for the pixel falling within the mixed area. When a target pixel has a more background component as shown in FIG. 31, in other words, when the target pixel has a higher correlation with the pixel in the background, the corresponding pixel value in the background is set as the pixel value in the double-density image in the background. Based on equation (4) or equation (5), the pixel value in the double-density image in the foreground is generated.

The image processing apparatus generates the double-density image for the pixel falling within the mixed area. When a target pixel has a more foreground component as shown in FIG. 31, in other words, when the target pixel has a higher correlation with the pixel in the foreground, the corresponding pixel value in the foreground is set as the pixel value in the double-density image in the foreground. Based on equation (4) or equation (5), the pixel value in the double-density image in the background is generated.

Figure 32:
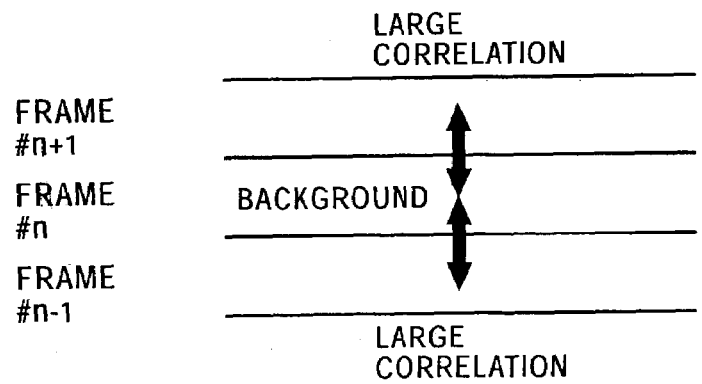
FIG. 32 is a diagram illustrating a process performed on a pixel in the background area.
Figure 33:
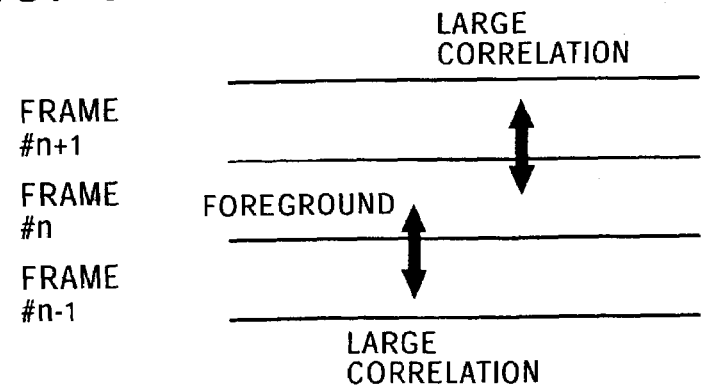
FIG. 33 is a diagram illustrating a process performed on a pixel in the foreground area.

The image processing apparatus generates the double-density image for the pixel falling with the background area. Referring to FIG. 32, a pixel having a higher correlation is selected, and the pixel value in the frame having the high correlation is set as the corresponding pixel value in the double-density image, and another pixel value in the double-density image is generated based on equation (4) or (5).

In this way, a double-density image is generated based on the pixel value of the background having less noise.

The image processing apparatus generates the double-density image for the pixel falling with the foreground area. Referring to FIG. 32, a pixel having a higher correlation is selected, and the pixel value in the frame having the higher correlation is set as the corresponding pixel value in the double-density image, and another pixel value in the double-density image is generated based on equation (4) or (5).

FIG. 34 through FIG. 42 illustrate the results of the generation of the double-density image by the image processing apparatus of the present invention.

Figure 34:
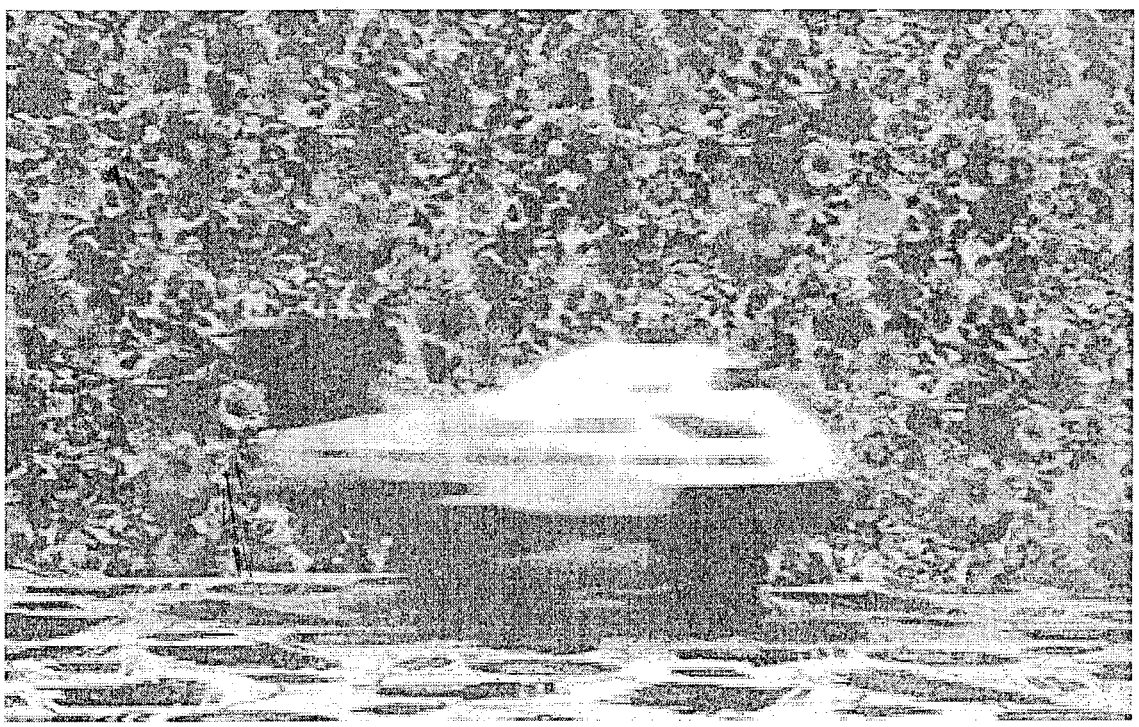
FIG. 34 illustrates the example of an input image.

FIG. 34 illustrates the example of an input image having the shutter time 2 ts.

Figure 35:
FIG. 35 illustrates the example of an enlarged input image.

FIG. 35 illustrates the example of an enlarged image containing a mixed area in the input image having the shutter time 2 ts.

Figure 36:
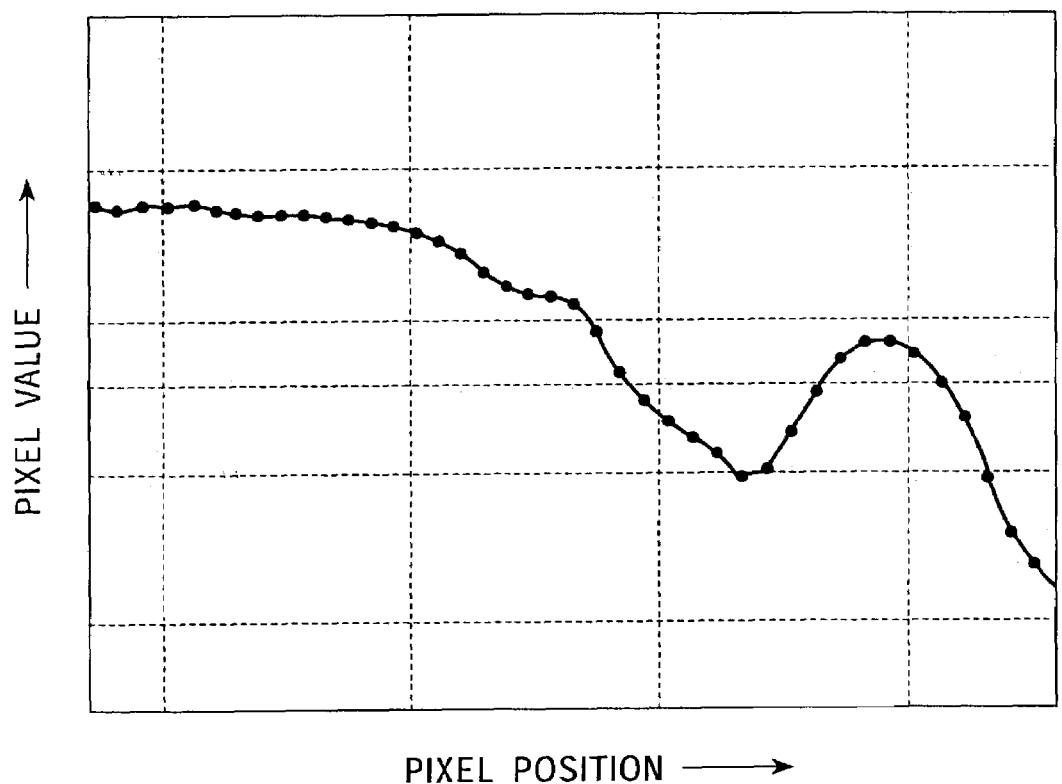
FIG. 36 illustrates a variation in the pixel value with respect to a pixel position in the input image.

FIG. 36 illustrates a change in the pixel value with respect to a pixel position in the input image containing the mixed area and having the shutter time 2 ts. Referring to FIG. 36, the abscissa represents the pixel position, and the ordinate represents the pixel value.

Figure 37:
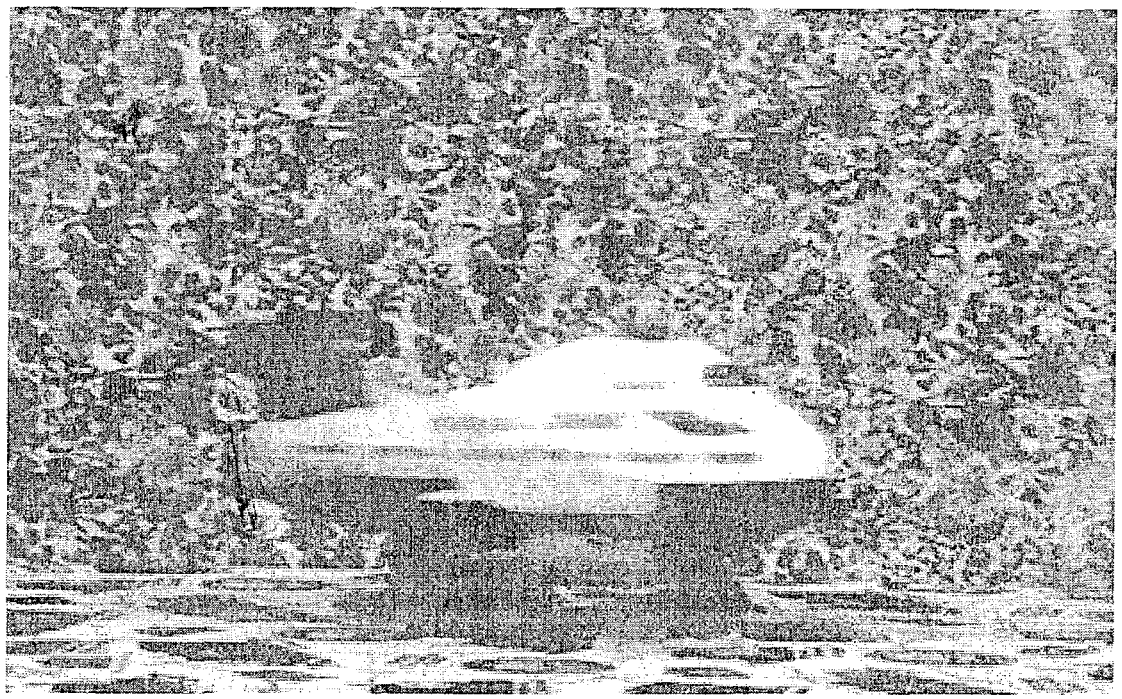
FIG. 37 illustrates the example of a double-density image.

FIG. 37 illustrates the example of a half-side of the double-density image generated by the image processing apparatus in response to the input image.

Figure 38:
FIG. 38 illustrates the example of an enlarged double-density image.

FIG. 38 is an enlarged view of the half side of the double-density image, containing the mixed area, generated by the image processing apparatus in response to the input image.

Figure 39:
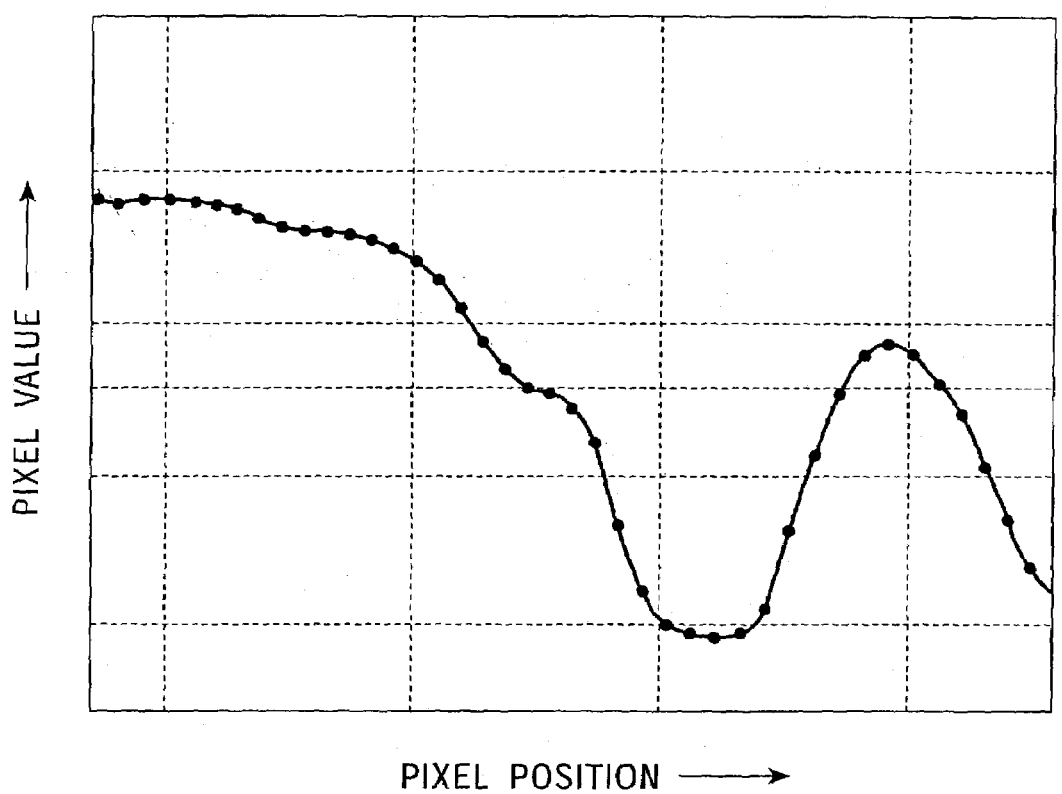
FIG. 39 illustrates a variation in the pixel value corresponding to a pixel position in the input image.

FIG. 39 plots a change in the pixel value with respect to the pixel position in the half side of the double-density image, containing the mixed area, generated by the image processing apparatus in response to the input image. Referring to FIG. 39, the abscissa represents the pixel position, while the ordinate represents the pixel value.

Figure 40:
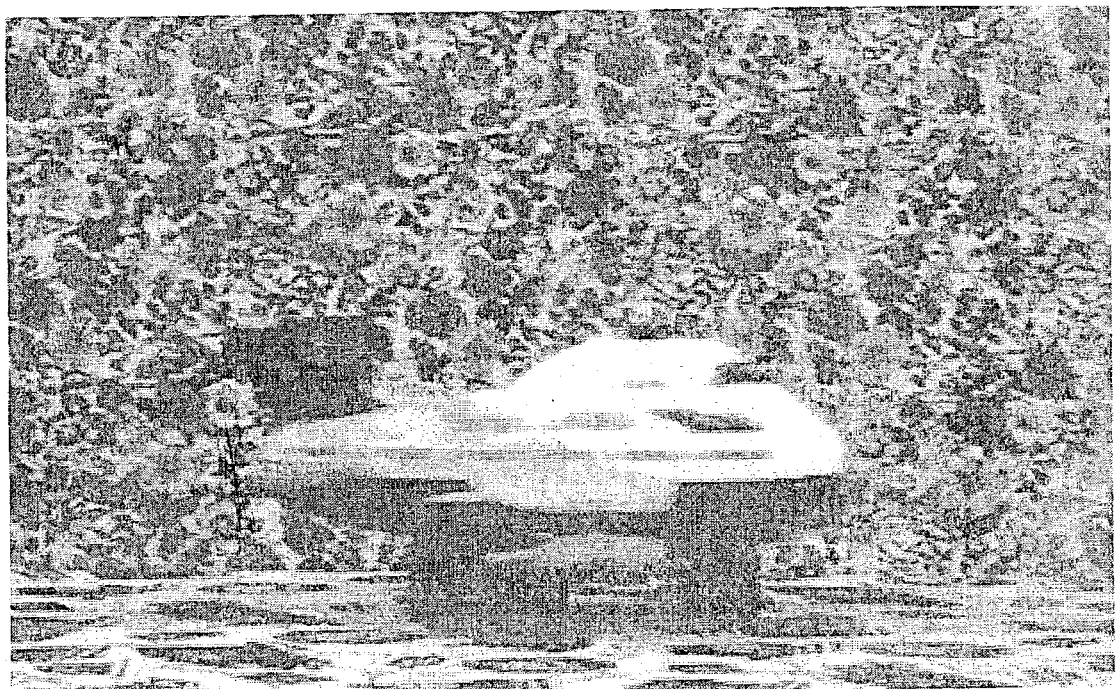
FIG. 40 illustrates the example of the double-density image.

FIG. 40 illustrates the other half of the double-density image generated by the image processing apparatus in response to the input image. The double-density image illustrated in FIG. 40 is a next image subsequent to the double-density image illustrated in FIG. 37.

Figure 41:
FIG. 41 illustrates the example of the enlarged double-density image.

FIG. 41 is an enlarged view of the other half of the double-density image, containing the mixed area, generated by the image processing apparatus in response to the input image.

Figure 42:
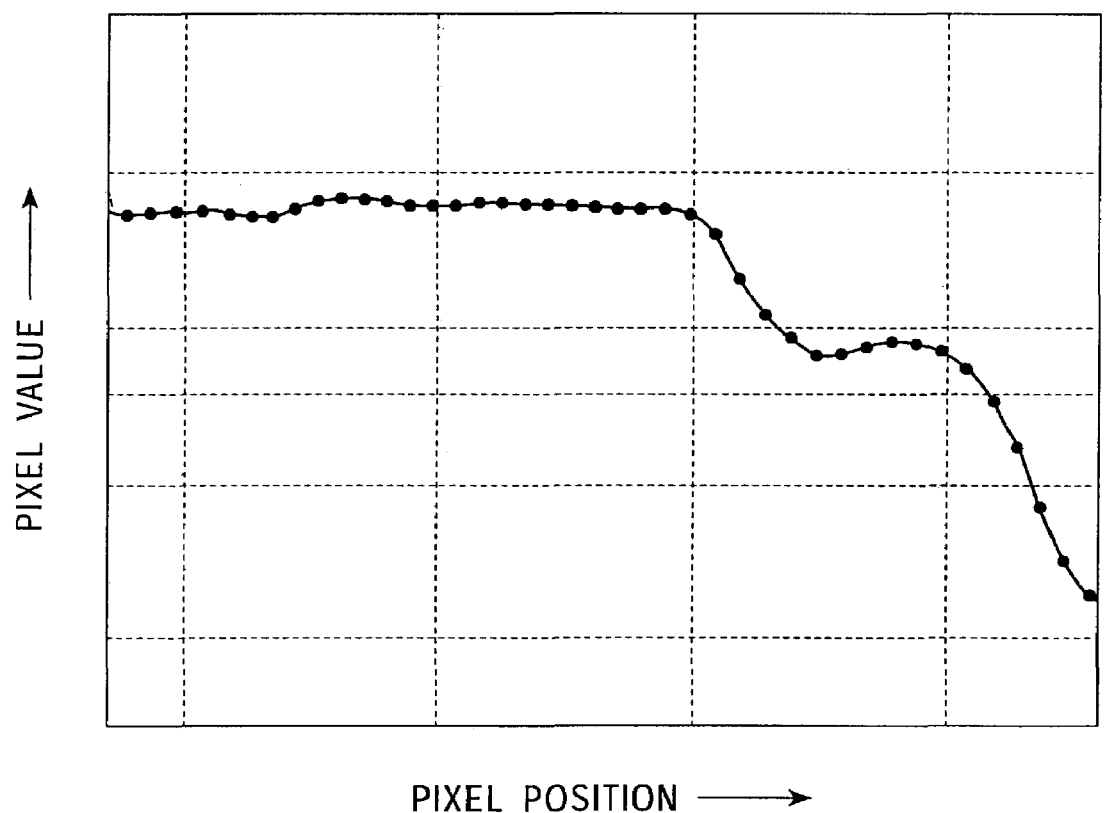
FIG. 42 illustrates a variation in the pixel value corresponding to a pixel position in the input image.

FIG. 42 plots a change in the pixel value with respect to the pixel position in the other half of the double-density image, containing the mixed area, generated by the image processing apparatus in response to the input image. Referring to FIG. 42, the abscissa represents the pixel position, while the ordinate represents the pixel value.

In the double-density images shown in FIG. 34 through FIG. 42 generated by the image processing apparatus, the width of the mixed area is as half as the width of the mixed area in the input image.

Also in the double-density images shown in FIG. 34 through FIG. 42 generated by the image processing apparatus, the amount of motion blur is as half as the amount of motion blur in the input image.

Figure 43:
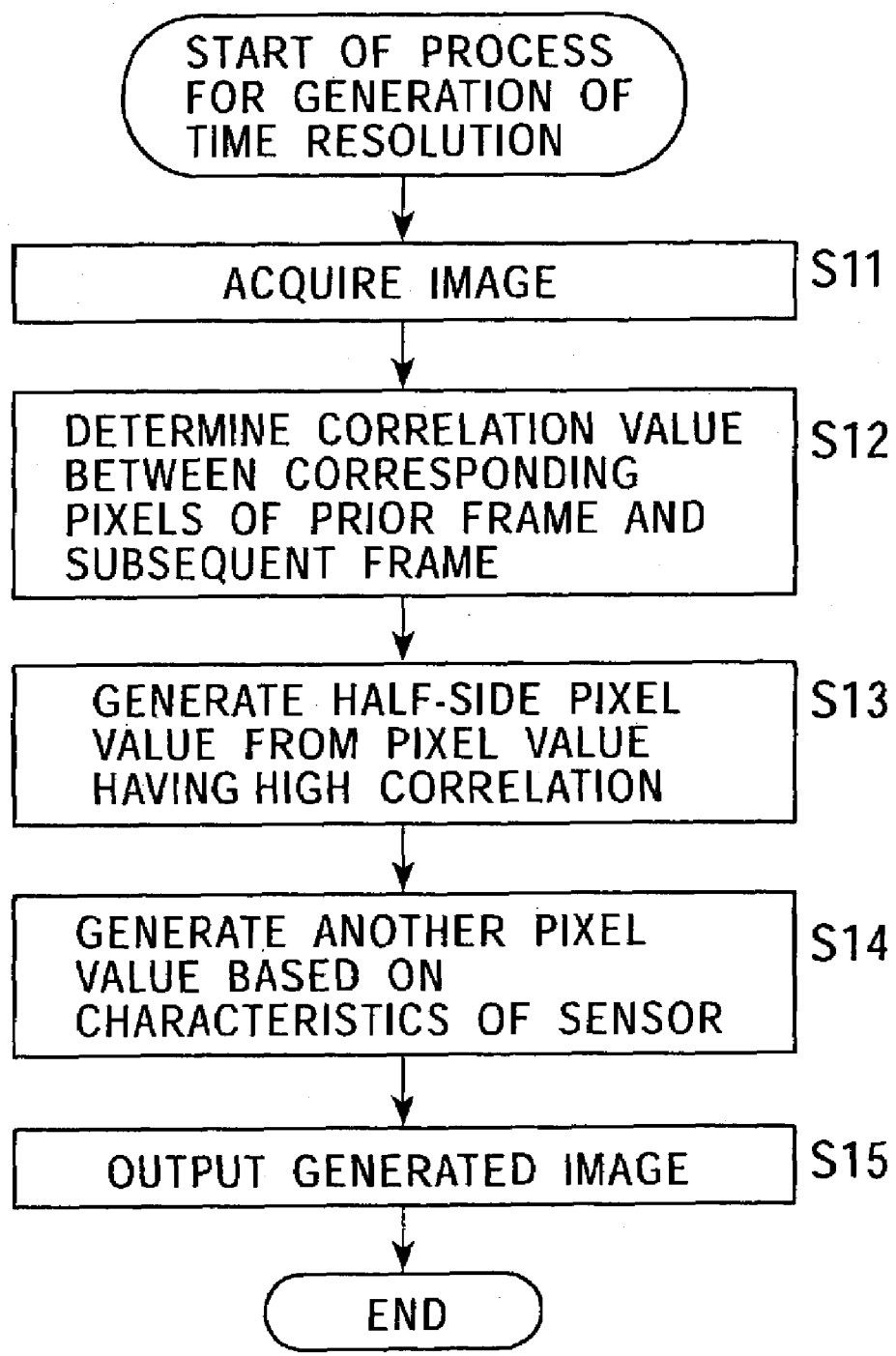
FIG. 43 is a flow diagram illustrating the process of time resolution generation in which an image having a double density in the direction of time is generated.

Referring to a flow diagram illustrated in FIG. 43, a process of time resolution of the image processing apparatus of the present invention for generating an image having a double density in the direction of time is discussed below.

In step S11, the image processing apparatus acquires an input image. The acquired image is stored in the frame memory 101 and the frame memory 102, and is delayed by frame. Each delayed frame is fed to the correlation calculator 103 or the correlation calculator 104.

In step S12, the correlation calculator 103 calculates the correlation value with a corresponding pixel in a subsequent frame, and the calculated correlation value is then fed to the half-side pixel value generator 105. The correlation calculator 104 calculates the correlation value with a corresponding pixel in a prior frame, and feeds the calculated correlation value to the half-side pixel value generator 105.

In step S13, the half-side pixel value generator 105 generates a half-side pixel value of the double-density image from the pixel value having a higher correlation value, based on the correlation value supplied from the correlation calculator 103 and the correlation value supplied from the correlation calculator 104. The half-side pixel value generator 105 supplies the half-side pixel value generator 106 with the generated pixel value.

For example, the half-side pixel value generator 105 generates a pixel value of a frame having a double-density image arranged at a position equally spaced in time from one of the subsequent frame and the prior frame having the higher correlation and a target frame.

In step S14, the half-side pixel value generator 106 generates the other pixel value of the double-density image through the calculation taking into the characteristics of the sensor, based on the pixel value of the target pixel and the half-side pixel value of the double-density image fed from the half-side pixel value generator 105.

For example, the half-side pixel value generator 106 generates a pixel value of a frame having a double-density image arranged at a position equally spaced in time from one of the subsequent frame and the prior frame having the higher correlation and a target frame.

In step S15, the half-side pixel value generator 105 and the half-side pixel value generator 106 output the double-density image formed of the generated pixel values and the process ends.

In this way, the image processing apparatus generates and outputs the image having a double density in the direction of time.

Specifically, the correlation calculator 103 and the correlation calculator 104 respectively calculate correlations between data of a target pixel in a target frame and data of pixels, corresponding to the target pixel, in a first frame and a second frame adjacent to the target frame. Based the pixel date of one of the corresponding pixels in the first frame and the second frame, detected by the correlation calculator 103 or the correlation calculator 104, having a large correlation, the half-side pixel value generator 105 and the half-side pixel value generator 106 generate first pixel data in a first synthesis frame generated between the target frame and one of the first and second frames containing the corresponding pixel having the pixel data with the large correlation, and generate second frame data in a second synthesis frame generated between the target frame and the other of the first and second frames, based on the target pixel data and the first pixel data. An image having a double density in the direction of time is thus generated and output.

The half-side pixel value generator 105 and the half-side pixel value generator 106 generate the first synthesis frame equally spaced in time from the first frame and the target frame, and the second synthesis frame equally spaced in time from the second frame and the target frame.

Figure 44:
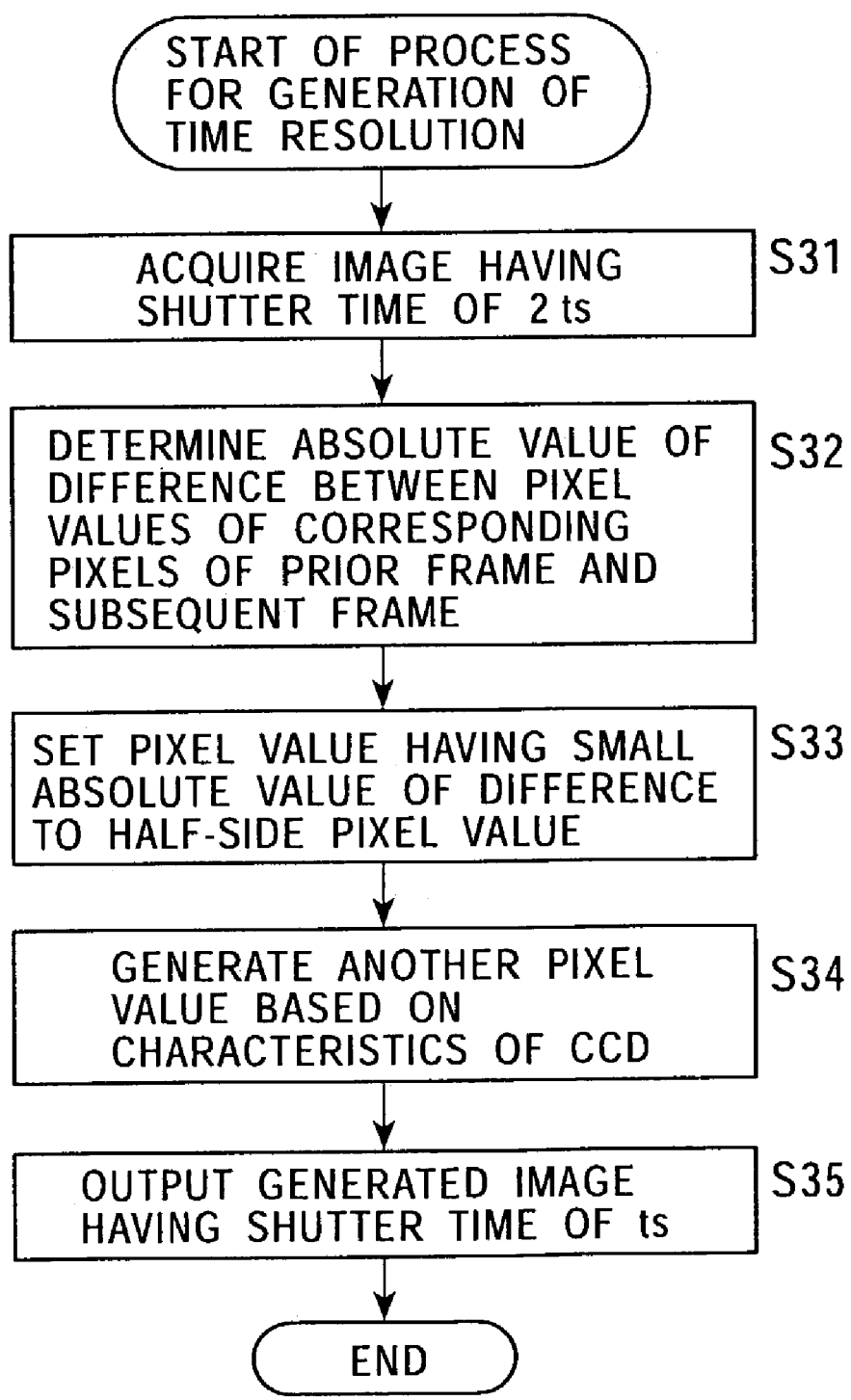
FIG. 44 is a flow diagram illustrating the process of time resolution generation in which an image having a double density in the direction of time is generated.

Referring to a flow diagram illustrated in FIG. 44, a process of time resolution of the image processing apparatus of the present invention for generating an image having a double density in the direction of time is discussed below.

In step S31, the image processing apparatus acquires an image having a shutter time 2 ts. The acquired image is stored in the frame memory 101 and the frame memory 102 and is delayed by frame. Each delayed frame is fed to the correlation calculator 103 or the correlation calculator 104.

In step S32, the correlation calculator 103 calculates the absolute value of a difference in pixel value between a pixel in a target frame and a corresponding pixel in a subsequent frame, and feeds the absolute value of the difference of the pixel values to the half-side pixel value generator 105. The correlation calculator 104 calculates the absolute value of a difference in pixel value between the pixel in the target frame and a corresponding pixel in a prior frame, and feeds the absolute value of the difference of the pixel values to the half-side pixel value generator 105.

The correlation calculator 103 or the correlation calculator 104 may detect a difference between the pixel values as a correlation.

In step S33, the half-side pixel value generator 105 sets the pixel value having a smaller absolute value as a half-side pixel value in the double-density image, based on the absolute value of the difference of the pixel values supplied from the correlation calculator 103 and the absolute value of the difference of the pixel values supplied from the correlation calculator 104. Specifically, the half-side pixel value generator 105 copies the pixel value of one of the corresponding pixels in the subsequent frame and the prior frame with respect to the target frame detected by the correlation calculator 103 or the correlation calculator 104, whichever has a larger correlation, as a pixel value in the synthesis frame generated between the target frame and the one of the subsequent frame and the prior frame having the pixel value having the larger correlation.

The half-side pixel value generator 105 feeds the half-side pixel value generator 106 with a double-density image with the pixel value having the smaller absolute value of difference.

In step S34, the half-side pixel value generator 106 generates the other pixel value of the double-density image through the calculation taking into consideration the characteristics of the CCD based on the pixel value of the target frame, and the double-density image with the pixel value having the smaller absolute value of difference fed from the half-side pixel value generator 105.

For example, the half-side pixel value generator 106 calculates the other pixel value of the double-density image by subtracting the pixel value of the pixel in the double-density image with the pixel value having the smaller absolute value of difference from a value equal to twice the pixel value of the pixel in the target frame.

In step S35, the half-side pixel value generator 105 and the half-side pixel value generator 106 output the double-density image having the generated pixel value and having the shutter time ts and the process ends.

In this way, the half-side pixel value generator 105 copies the pixel data of the one of the corresponding pixels in the first and second frames detected by the correlation calculator 103 and the correlation calculator 104, whichever has a larger correlation, as the first pixel data in the first synthesis frame generated between the target frame and the one of the first and second frames having the corresponding data having the larger correlation.

The half-side pixel value generator 106 calculates the second pixel data by subtracting the first pixel data from a value equal to twice the target pixel data.

One of the correlation calculator 103 and the correlation calculator 104 detects the difference of the pixel data as the correlation.

In accordance with the present invention, the image processing apparatus of the present invention generates the double-density image having the shutter time ts from the image having the shutter time 2 ts and outputs the double-density image.

In the above discussion, the image processing apparatus of this invention generates an image having a double density in the direction of time. By repeating the above process, 4-fold, 8-fold, and 16-fold density images may be generated.

The movement of the object of the foreground is from left to right, but the direction of the movement of the foreground object is not limited to any particular direction.

The sensor is not limited the CCD. The sensor may be any solid-state image pickup device, such as CMOS (Complementary Metal Oxide Semiconductor) image sensor, a BBD (Bucket Bridge Device), a CID (Charge Injection Device), or a CPD (Charge Priming Device). The sensor is not limited to a sensor which includes a matrix of detector elements, and may be a sensor in which a line of detector elements is arranged.

The storage medium storing a program for performing the signal processing of the present invention includes a package medium which is distributed to supply the user with a software program, separate from a computer, as shown in FIG. 1. The package medium may be a magnetic disk 51 (such as a flexible disk), an optical disk 52 (such as a CD-ROM (Compact-Disk Read-Only Memory), DVD (Digital Versatile Disk)), a magnetooptical disk 53 (such as MD (Mini-Disk) (Tradename)), a semiconductor memory 54. The storage medium also includes a ROM 22 which stores a program and is supplied in a computer to the user or a hard disk contained in the storage unit 28.

The present invention includes a process in which steps describing a program stored in the storage medium are sequentially performed in the order described, and a process in which steps are performed in parallel or separately rather than being sequentially performed.

INDUSTRIAL APPLICABILITY

The present invention results in an image having a high density in the direction of time and a natural-looking motion blur.

The invention claimed is:

1. An image processing apparatus for processing an image fanned of pixel data of frames, obtained by a sensor including detector elements, each having a time integration effect, comprising:
a correlation detector for detecting a correlation between pixel data of a target pixel in a target frame from among frames and pixel data of a corresponding pixel in a first frame adjacent to the target frame, and a correlation between the pixel data of the target pixel in the target frame and pixel data of a corresponding pixel in a second frame adjacent to the target frame; and
a pixel data generator for generating pixel data of a first pixel in a first synthesis frame generated between the target frame and one of the first and second frames containing the corresponding pixel having the pixel data with a larger correlation, based on the pixel data of one of the corresponding pixels in the first and second frames having the larger correlation detected by the correlation detector, and for generating pixel data of a second pixel in a second synthesis frame generated between the target frame and the other of the first and second frames, based on the pixel data of the target pixel and the pixel data of the first pixel.

2. The image processing apparatus according to claim 1, wherein the pixel data generator copies the pixel data of the one of the corresponding pixels in the first and second frames having the larger correlation detected by the correlation detector as the pixel data of the first pixel in the first synthesis frame generated between the target frame and the one of the first and second frames containing the corresponding pixel having the pixel data with the larger correlation.

3. The image processing apparatus according to claim 1, wherein the pixel data generator generates the first synthesis frame at a position equally spaced in time from the first frame and the target frame, and the second synthesis frame at a position equally spaced in time from the second frame and the target frame.

4. The image processing apparatus according to claim 1, wherein the pixel data generator calculates the pixel data of the second pixel by subtracting the value of the pixel data of the first pixel from a value equal to twice the value of the pixel data of the target pixel.

5. The image processing apparatus according to claim 1, wherein the image is processed which is obtained by the sensor having a plurality of detector elements arranged in at least one direction.

6. The image processing apparatus according to claim 1, wherein the image is processed which is obtained by the sensor having a plurality of detector elements arranged in a matrix form.

7. The image processing apparatus according to claim 1, wherein the correlation detector detects a difference of the pixel data as the correlation.

8. An image processing method of an image processing apparatus for processing an image formed of pixel data of frames, obtained by a sensor including detector elements, each having a time integration effect, comprising:
a correlation detection step for detecting a correlation between pixel data of a target pixel in a target frame from among frames and pixel data of a corresponding pixel in a first frame adjacent to the target frame, and a correlation between the pixel data of the target pixel in the target frame and pixel data of a corresponding pixel in a second frame adjacent to the target frame; and
a pixel data generation step for generating pixel data of a first pixel in a first synthesis frame generated between the target frame and one of the first and second frames containing the corresponding pixel having the pixel data with a larger correlation, based on the pixel data of one of the corresponding pixels in the first and second frames having the larger correlation detected in the correlation detection step, and for generating pixel data of a second pixel in a second synthesis frame generated between the target frame and the other of the first and second frames, based on the pixel data of the target pixel and the pixel data of the first pixel.

9. The image processing method according to claim 8, wherein the pixel data generation step copies the pixel data of the one of the corresponding pixels in the first and second frames having the larger correlation detected in the correlation detection step as the pixel data of the first pixel in the first synthesis frame generated between the target frame and the one of the first and second frames containing the corresponding pixel having the pixel data with the larger correlation.

10. The image processing method according to claim 8, wherein the pixel data generation step generates the first synthesis frame at a position equally spaced in time from the first frame and the target frame, and the second synthesis frame at a position equally spaced in time from the second frame and the target frame.

11. The image processing method according to claim 8, wherein the pixel data generation step calculates the pixel data of the second pixel by subtracting the value of the pixel data of the first pixel from a value equal to twice the value of the pixel data of the target pixel.

12. The image processing method according to claim 8, wherein the image is processed which is obtained by the sensor having a plurality of detector elements arranged in at least one direction.

13. The image processing method according to claim 8, wherein the image is processed which is obtained by the sensor having a plurality of detector elements arranged in a matrix form.

14. The image processing method according to claim 8, wherein the correlation detection step detects a difference of the pixel data as the correlation.

15. A computer readable storage medium storing an image processing, computer readable program for processing an image formed of pixel data of frames, obtained by a sensor including detector elements, each having a time integration effect, the program comprising:
  a correlation detection step for detecting a correlation between pixel data of a target pixel in a target frame from among frames and pixel data of a corresponding pixel in a first frame adjacent to the target frame, and a correlation between the pixel data of the target pixel in the target frame and pixel data of a corresponding pixel in a second frame adjacent to the target frame; and
  a pixel data generation step for generating pixel data of a first pixel in a first synthesis frame generated between the target frame and one of the first and second frames containing the corresponding pixel having the pixel data with a larger correlation, based on the pixel data of one of the corresponding pixels in the first and second frames having the larger correlation detected in the correlation detection step, and for generating pixel data of a second pixel in a second synthesis frame generated between the target frame and the other of the first and second frames, based on the pixel data of the target pixel and the pixel data of the first pixel.

16. The computer readable storage medium according to claim 15, wherein the pixel data generation step copies the pixel data of the one of the corresponding pixels in the first and second frames having the larger correlation detected in the correlation detection step as the pixel data of the first pixel in the first synthesis frame generated between the target frame and the one of the first and second frames containing the corresponding pixel having the pixel data with the larger correlation.

17. The computer readable storage medium according to claim 15, wherein the pixel data generation step generates the first synthesis frame at a position equally spaced in time from the first frame and the target frame, and the second synthesis frame at a position equally spaced in dine from the second frame and the target frame.

18. The computer readable storage medium according to claim 15, wherein the pixel data generation step calculates the pixel data of the second pixel by subtracting the value of the pixel data of the first pixel from a value equal to twice the value of the pixel data of the target pixel.

19. The computer readable storage medium according to claim 15, wherein the image is processed which is obtained by the sensor having a plurality of detector elements arranged in at least one direction.

20. The computer readable storage medium according to claim 15, wherein the image is processed which is obtained by the sensor having a plurality of detector elements arranged in a matrix form.

21. The computer readable storage medium according to claim 15, wherein the correlation detection step detects a difference of the pixel data as the correlation.

22. A computer program, recorded on a computer readable medium, to be executed on a computer controlling an image processing apparatus for processing an image formed of pixel data of frames, obtained by a sensor including detector elements, each having a time integration effect, the program comprising:
  a correlation detection step for detecting a correlation between pixel data of a target pixel in a target frame from among frames and pixel data of a corresponding pixel in a first frame adjacent to the target frame, and a correlation between the pixel data of the target pixel in the target frame and pixel data of a corresponding pixel in a second frame adjacent to the target frame; and
  a pixel data generation step for generating pixel data of a first pixel in a first synthesis frame generated between the target frame and one of the first and second frames containing the corresponding pixel having the pixel data with a larger correlation, based on the pixel data of one of the corresponding pixels in the first and second frames having the larger correlation detected in the correlation detection step, and for generating pixel data of a second pixel in a second synthesis frame generated between the target frame and the other of the first and second frames based on the pixel data of the target pixel and the pixel data of the first pixel.

23. The computer program according to claim 22, wherein the pixel data generation step copies the pixel data of the one of the corresponding pixels in the first and second frames having the larger correlation detected in the correlation detection step as the pixel data of the first pixel in the first synthesis frame generated between the target frame and the one of the first and second frames containing the corresponding pixel having the pixel data with the larger correlation.

24. The computer program according to claim 22, wherein the pixel data generation step generates the first synthesis frame at a position equally spaced in time from the first frame and the target frame, and the second synthesis frame at a position equally spaced in time from the second frame and the target frame.

25. The computer program according to claim 22, wherein the pixel data generation step calculates the pixel data of the second pixel by subtracting the value of the pixel data of the first pixel from a value equal to twice the value of the pixel data of the target pixel.

26. The computer program according to claim 22, wherein the image is processed which is obtained by the sensor having a plurality of detector elements arranged in at least one direction.

27. The computer program according to claim 22, wherein the image is processed which is obtained by the sensor having a plurality of detector elements arranged in a matrix form.

28. The computer program according to claim 22, wherein the correlation detection step detects a difference of the pixel data as the correlation.

29. An image pickup device comprising,
   an image pickup unit for outputting, as pixel data of frames, an object image picked up by the image pickup unit having a predetermined number of pixels, each having a time integration effect;
   a correlation detector for detecting a correlation between pixel data of a target pixel in a target frame from among frames and pixel data of a corresponding pixel in a first frame adjacent to the target frame, and a correlation between the pixel data of the target pixel in the target frame and pixel data of a corresponding pixel in a second frame adjacent to the target frame; and
   a pixel data generator for generating pixel data of a first pixel in a first synthesis frame generated between the target frame and one of the first and second frames containing the corresponding pixel having the pixel data with a larger correlation, based on the pixel data of one of the corresponding pixels in the first and second frames having the larger correlation detected by the correlation detector, and for generating pixel data of a second pixel in a second synthesis frame generated between the target frame and the other of the first and second frames, based on the pixel data of the target pixel and the pixel data of the first pixel.

30. The image pickup device according to claim 29, wherein the pixel data generator copies the pixel data of the one of the corresponding pixels in the first and second frames having the larger correlation detected by the correlation detector as the pixel data of the first pixel in the first synthesis frame generated between the target frame and the one of the first and second frames containing the corresponding pixel having the pixel data with the larger correlation.

31. The image pickup device according to claim 29, wherein the pixel data generator generates the first synthesis frame at a position equally spaced in time from the first frame and the target frame, and the second synthesis frame at a position equally spaced in time from the second frame and the target frame.

32. The image pickup device according to claim 29, wherein the pixel data generator calculates the pixel data of the second pixel by subtracting the value of the pixel data of the first pixel from a value equal to twice the value of the pixel data of the target pixel.

33. The image pickup device according to claim 29, wherein the image is processed which is obtained by the sensor having a plurality of detector elements arranged in at least one direction.

34. The image pickup device according to claim 29, wherein the image is processed which is obtained by the sensor having a plurality of detector elements arranged in a matrix form.

35. The image pickup device according to claim 29, wherein the correlation detector detects a difference of the pixel data as the correlation.

* * * * *

UNITED STATES PATENT AND TRADEMARK OFFICE
CERTIFICATE OF CORRECTION

PATENT NO. : 7,218,791 B2
APPLICATION NO. : 10/276229
DATED : May 15, 2007
INVENTOR(S) : Tetsujiro Kondo et al.

It is certified that error appears in the above-identified patent and that said Letters Patent is hereby corrected as shown below:

Title Page,

Item (75) Inventors:

Change "Junichi Ishbashi, Saitama (JP)" to

--Junichi Ishibashi, Saitama, (JP)--.

Signed and Sealed this

Twenty-fourth Day of July, 2007

JON W. DUDAS
*Director of the United States Patent and Trademark Office*